(12) United States Patent
Merdassa

(10) Patent No.: US 12,231,462 B2
(45) Date of Patent: Feb. 18, 2025

(54) MANAGING DIGITAL ASSETS IN VIRTUAL ENVIRONMENTS

(71) Applicant: Bank of America Corporation, Charlotte, NC (US)

(72) Inventor: Naoll Addisu Merdassa, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 252 days.

(21) Appl. No.: 17/812,666

(22) Filed: Jul. 14, 2022

(65) Prior Publication Data
US 2024/0022599 A1 Jan. 18, 2024

(51) Int. Cl.
*H04L 9/40* (2022.01)

(52) U.S. Cl.
CPC ...... *H04L 63/1466* (2013.01); *H04L 63/1416* (2013.01); *H04L 63/1433* (2013.01)

(58) Field of Classification Search
CPC ............. H04L 63/1466; H04L 63/1416; H04L 63/1433; H04L 63/14; H04L 9/40
See application file for complete search history.

(56) References Cited

U.S. PATENT DOCUMENTS

| | | | |
|---|---|---|---|
| 8,082,297 B2 | 12/2011 | Syvain et al. | |
| 8,631,417 B1 | 1/2014 | Mendes Da Costa et al. | |
| 9,165,426 B2 | 10/2015 | Jones et al. | |
| 9,342,211 B2 | 5/2016 | Deluca et al. | |
| 9,900,554 B2 | 2/2018 | Ursin et al. | |
| 10,326,667 B2 | 6/2019 | Jones et al. | |
| 10,587,584 B2 | 3/2020 | Vikramaratne et al. | |
| 10,610,787 B2 | 4/2020 | Hamilton, II et al. | |
| 10,931,650 B1 | 2/2021 | Mccown et al. | |
| 10,981,069 B2 | 4/2021 | Kawachiya et al. | |
| 11,170,003 B2 | 11/2021 | Wu et al. | |
| 2006/0184651 A1* | 8/2006 | Tirnumala | H04L 67/34 709/229 |
| 2007/0254631 A1 | 11/2007 | Spooner | |
| 2010/0250383 A1 | 9/2010 | Frazier et al. | |
| 2011/0072367 A1 | 3/2011 | Bauer | |

(Continued)

FOREIGN PATENT DOCUMENTS

| | | |
|---|---|---|
| CN | 101496022 B | 5/2012 |
| CN | 102450032 B | 3/2013 |

(Continued)

*Primary Examiner* — Quazi Farooqui

(57) ABSTRACT

A system includes a memory associated with a first virtual environment that stores digital assets associated with a user. The memory is coupled to a processor that is configured to receive a user credential associated with the user and authorize the user to access the first virtual environment. The processor receives a request from the user to enter a second virtual environment accessible through the first virtual environment and generates a virtual pass for a first avatar of the user to enter the second virtual environment. The processor receives a request to perform in the second environment a data interaction associated with a digital asset and provides the first avatar access from the second environment to the digital asset. The processor receives an indication that the data interaction is completed and updates the digital asset in the memory to reflect the data interaction.

20 Claims, 7 Drawing Sheets

(56) References Cited

U.S. PATENT DOCUMENTS

| | | | |
|---|---|---|---|
| 2013/0311565 A1* | 11/2013 | Barry | G06F 21/10 |
| | | | 709/204 |
| 2014/0026078 A1 | 1/2014 | Dawson et al. | |
| 2018/0104595 A1 | 4/2018 | Kawachiya et al. | |
| 2018/0123816 A1 | 5/2018 | Tandon et al. | |
| 2020/0338458 A1 | 10/2020 | Huang et al. | |
| 2021/0042748 A1 | 2/2021 | Sepulveda et al. | |
| 2022/0351280 A1* | 11/2022 | Cardenas Gasca | ............. |
| | | | G06Q 30/0643 |
| 2023/0259640 A1* | 8/2023 | Metzler | G06F 21/6218 |
| | | | 713/191 |

FOREIGN PATENT DOCUMENTS

| | | |
|---|---|---|
| CN | 104468741 B | 1/2019 |
| CN | 112446450 A | 3/2021 |
| JP | 2006072952 A | 3/2006 |
| WO | 2020000798 A1 | 2/2020 |

\* cited by examiner

MANAGING DIGITAL ASSETS IN VIRTUAL ENVIRONMENTS

TECHNICAL FIELD

The present disclosure relates generally to network communication, and more specifically to managing digital assets in virtual environments.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and preventing malicious activities. Data storing user devices, such as computers, laptops, augmented reality devices, virtual reality devices, and smartphones, are vulnerable to attacks. This vulnerability poses several network security challenges. Existing systems are typically unable to detect a malicious attack until after the attack has occurred. For example, a bad actor may pretend to be another user in a virtual environment which then allows the bad actor to gain access to other users' information.

SUMMARY

The system and methods implemented by the system as disclosed in the present disclosure provide technical solutions to the technical problems discussed above by allowing a user to securely access a virtual environment and perform secure data interactions in the virtual environment. The disclosed system and methods provide several practical applications and technical advantages.

For example, the disclosed system and methods provide the practical application of improving interoperability of real-world systems and virtual world systems (e.g., metaverse systems) so that information may be seamlessly shared between these systems to implement data security, authorization of data interactions, access to virtual environments and other data interactions performed in real-world and virtual environments. For example, user information collected from the user and/or assigned to the user in a real-world environment may be used in a virtual environment (e.g., metaverse environment) to authenticate the user before allowing the user to access the virtual environment and perform any kind of action or interaction within the virtual environment. Additionally, or alternatively, as described in embodiments of the present disclosure, user information collected from the user and/or assigned to the user in the real-world environment may be used to provide access to the user to one or more secondary virtual environments through a primary virtual environment. This process provides improved information security because it authenticates that an avatar is associated with the user and not an unauthorized party and that the user is authorized to access the primary virtual environment and the secondary virtual environments.

Thus, the disclosed system and methods improve data security in the virtual environment. By improving data security in virtual environment, the disclosed system and methods generally improve technology related to performing secure data interactions in a virtual environment.

The disclosed system and methods provide the additional practical application of saving memory resources. The seamless data flow between the real-world systems and virtual-world systems as a result of interoperability of these systems allows each system to store less data by avoiding the need to store the same data (e.g., authentication data, login credentials, etc.) in both systems, as data stored in one system can be accessed, or otherwise leveraged, by the other system. This saves memory resources by avoiding duplication of data. The saving of memory resources may leave more system memory for storing other data used in other technical operations. This provides the additional technical advantage of improving processing efficiency of computing systems that manage the real-world and virtual word environments.

The disclosed system and methods provide the additional practical application of saving processing resources by allowing a user to access several secondary virtual environments (e.g., metaverses) through a single primary virtual environment (e.g., a primary metaverse) using a single digital identity. By providing access to a plurality of secondary virtual environments through a single virtual environment portal, the disclosed system and methods use less processing resources by not having to use separate processing resources for the user to separately access each of the plurality of secondary virtual environments. Further additional processing resources are saved which would otherwise be used to transfer and/or convert digital assets, digital objects and avatar configurations between plurality of virtual environments. Saving processing resources generally improves the processing efficiency of systems managing the virtual environments and, in turn, improves the technology related to virtual-world environments.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Example System

Figure 1:
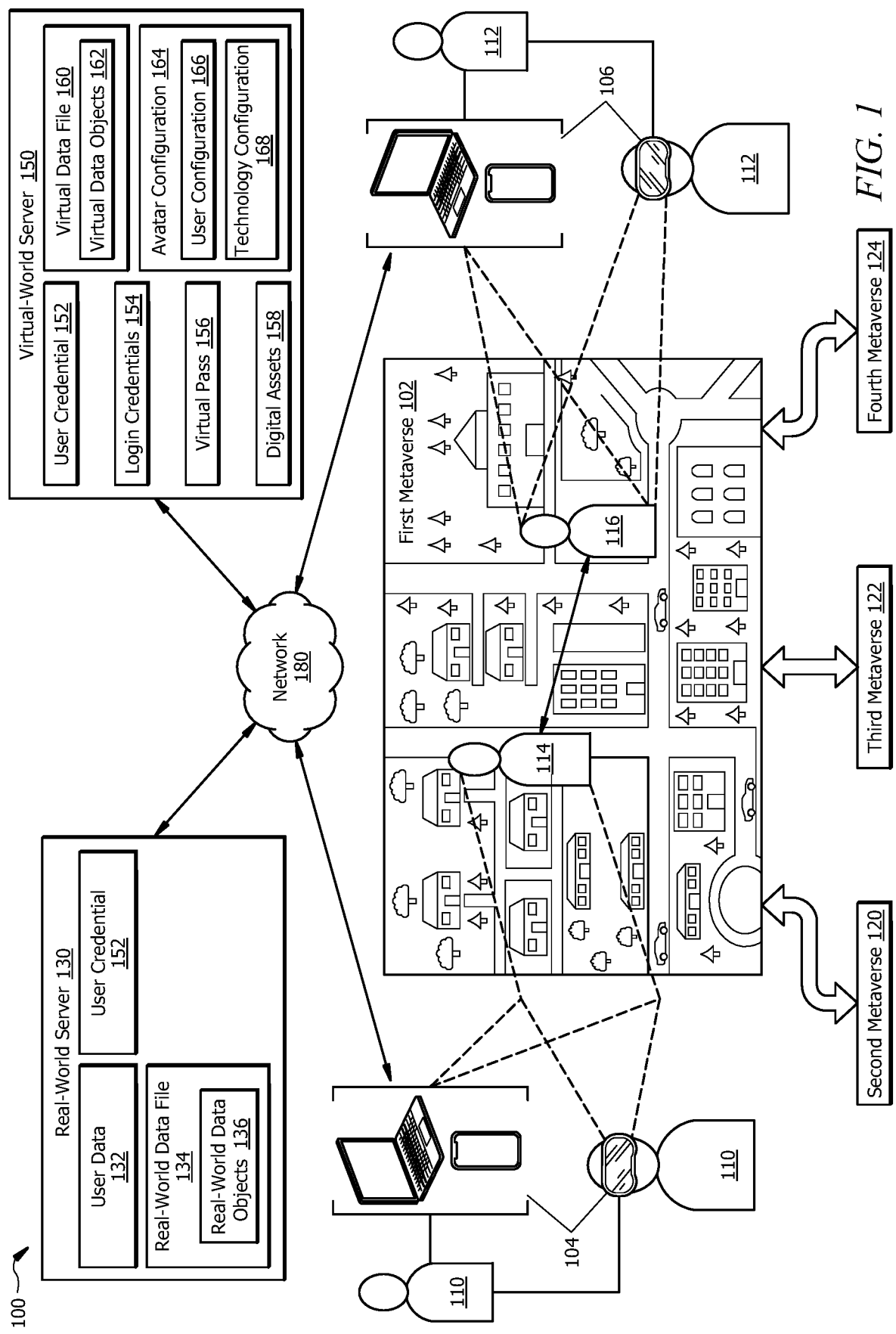
FIG. 1 is a schematic diagram of a system, in accordance with certain aspects of the present disclosure.

FIG. 1 is a schematic diagram of a system 100, in accordance with certain aspects of the present disclosure. System 100 may include a first user device 104, a second user device 106, real-world server 130, and virtual-world server 150 each connected to a network 180. A first user 110 is associated with the first user device 104 and a second user 112 is associated with the second user device 106. The system 100 may be communicatively coupled to the communication network 180 and may be operable to transmit data between each one of the first user device 104, second user device 106, real-world server 130, and virtual-world server 150 through the communication network 180.

In general, the system 100 may improve interoperability of real-world systems and virtual world systems (e.g., metaverse systems) so that information may be seamlessly shared between these systems to implement data security, authorization of data interactions and other data interactions performed in real-world and virtual environments. For example, user information collected from the user and/or assigned to the user in a real-world environment may be leveraged in a virtual environment (e.g., first metaverse 102) to authenticate the first user 110 before allowing the first user 110 to perform any kind of action or interaction within the virtual environment. This process provides improved information security because it relies on real-world information associated with the first user 110 to authenticate a first avatar 114 that is associated with the first user 110 in the virtual environment. It may be noted that the terms "real-world" and "real-world environment" in this disclosure refer to any non-virtual environment where users (e.g., users 110 and 112) can physically interact with real persons and objects. A real-world data interaction may refer to any data interaction performed outside the virtual environment (e.g., first metaverse 102). A virtual-world data interaction or a virtual data interaction may refer to any data interaction performed in a virtual environment (e.g., first metaverse 102). Further, it may be noted that while certain embodiments of the present disclosure are described in the context of a metaverse environment which is an example of a virtual environment, the methods discussed in this disclosure apply to any other virtual environment. For example, FIG. 1 shows four example virtual environments including first metaverse 102, second metaverse 120, third metaverse 122 and fourth metaverse 124. The terms "virtual environment", "metaverse environment" and "metaverse" are used interchangeably throughout this disclosure. Furthermore, it may be noted that while certain embodiments of this disclosure describe one or more operations in relation to the first user 110, these embodiments apply to any user (e.g., second user 112) connected to network 180. Additionally, while certain embodiments of this disclosure describe one or more operations in relation to the first metaverse 102, these embodiments apply to any other virtual environment including second metaverse 120, third metaverse 122 and fourth metaverse 124.

The first user 110 may access one or more virtual environments (e.g., first metaverse 102, second metaverse 120, third metaverse 122 and fourth metaverse 124) using the first user device 104. The first user device 104 is configured to display to the first user 110 a two-dimensional (2D) or three-dimensional (3D) representation of a virtual environment (e.g., metaverse) being accessed by first user 110. Examples of a virtual environment may include, but are not limited to, a graphical or virtual representation of a metaverse, a map, a building interior, a landscape, a fictional location, an alternate reality, or any other suitable type of location or environment. A virtual environment may be configured to use realistic or non-realistic physics for the motion of objects within the virtual environment. For example, some virtual environments may be configured to use gravity whereas other virtual environments may not be configured to use gravity. Within a virtual environment, each user may be associated with an avatar (such as the first avatar 114 for the first user 110 shown in the first metaverse 102). An avatar is a graphical representation of a user at a virtual location within the virtual environment. In embodiments, the virtual location of the avatar may be correlated to the physical location of a user in the real-world environment. Examples of an avatar may include, but are not limited to, a person, an animal, or an object. In some embodiments, the features and characteristics of the avatar may be customizable and user-defined. For example, the size, shape, color, attire, accessories, or any other suitable type of appearance features may be specified by a user. By using an avatar, a user is able to move within the virtual environment to interact with one or more avatars and objects within the virtual environment while independently remaining at a physical location in the real-world environment or being in transit in the real-world environment.

While engaging in the first metaverse 102 via the first avatar 114, the first user 110 may interact with a plurality of other users through a respective avatar. For example, the second user 112 may attempt to engage in an interaction session with the first avatar 114 through a second avatar 116 associated with the second user 112. In the real-world environment, the second user 112 may be physically located at a distance away from the first user 110. The second user 112 may access the first metaverse 102 through the second user device 106 to control the second avatar 116 and attempt to engage in an interaction session with the first user 110 through the first avatar 114.

Before the interaction between the first avatar 114 and second avatar 116 occurs or an interaction between the first avatar 114 and a virtual entity occurs in the first metaverse 102, the virtual-world server 150 may authenticate that the first avatar 114 is associated with the first user 110 and not some unauthorized third-party. For example, the first user 110 may be required to sign into a secure portal that provides access to a data file (e.g., real-world data file 134 and/or virtual data file 160) associated with the first user 110. As shown in FIG. 1, the real-world data file 134 of the first user 110 is stored and managed by the real-world server 130 and the virtual data file 160 is stored and managed by the virtual-world server 150. In one or more embodiments, the virtual-world server 150 may employ single sign-on (SSO), multifactor authentication, or any other suitable authentication scheme in order to allow the first user 110 access to the virtual data file 160 and/or the real-world data file 134. The virtual data file 160 and the real-world data file 134 may include virtual data objects 162 and real-world data objects 136 respectively owned by the first user 110. The real-world server 130 and the virtual-world server 150 may store other information related to the first user 110 including, but not limited to, user profile information, account information (e.g., including identity and other details relating to the respective data files 134 and 160), avatar information, digital assets, digital objects (e.g., respective real-world data objects 136 and virtual data objects 162) information, or any other suitable type of information that is associated with a user within any of the metaverses and/or the real-world environment.

Each of the real-world server 130 and the virtual-world server 150 is generally a suitable server (e.g., including a physical server and/or virtual server) operable to store data in a memory and/or provide access to application(s) or other services. One or both of the real-world server 130 and the virtual-world server 150 may be a backend server associated with a particular entity (e.g., organization) that facilitates conducting interactions between entities and one or more users. In other embodiments, one or both of the real-world server 130 and the virtual-world server 150 may be organized in a distributed manner, or by leveraging cloud computing technologies. Real-world server 130 may store information which is primarily used to support data interactions performed in the real-world environment. Virtual-world server 150 may store information which is primarily used to support data interactions performed in virtual environments (e.g., a metaverse environments). It may be noted that the operations performed by the real-world server 130 and the virtual-world server 150 described in embodiments of the present disclosure may be implemented by a single server.

The communication network 180 may facilitate communication within the system 100. This disclosure contemplates the communication network 180 being any suitable network operable to facilitate communication between the first user device 104, second user device 106, real-world server 130 and the virtual-world server 150. Communication network 180 may include any interconnecting system capable of transmitting audio, video, signals, data, messages, or any combination of the preceding. Communication network 180 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication network, a Zigbee network, and/or any other suitable network, operable to facilitate communication between the components of system 100. In other embodiments, system 100 may not have all of these components and/or may have other elements instead of, or in addition to, those above.

Each of the user devices (i.e., first user device 104 and second user device 106) may be any computing device configured to communicate with other devices, such as a server (e.g., real-world server 130 and/or virtual-world server 150), databases, etc. through the communication network 180. Each of the user devices may be configured to perform specific functions described herein and interact with one or both of real-world server 130 and the virtual-world server 150, e.g., via its user interfaces. Each of the user devices is a hardware device that is generally configured to provide hardware and software resources to a user. Examples of a user device include, but are not limited to, a virtual reality device, an augmented reality device, a laptop, a computer, a smartphone, a tablet, a smart device, an Internet-of-Things (IoT) device, or any other suitable type of device. The user devices may comprise a graphical user interface (e.g., a display), a touchscreen, a touchpad, keys, buttons, a mouse, or any other suitable type of hardware that allows a user to view data and/or to provide inputs into the user device. Each user device may be configured to allow a user to send requests to one or both of real-world server 130 and the virtual-world server 150, or to another user device.

Example User Device

Figure 2:
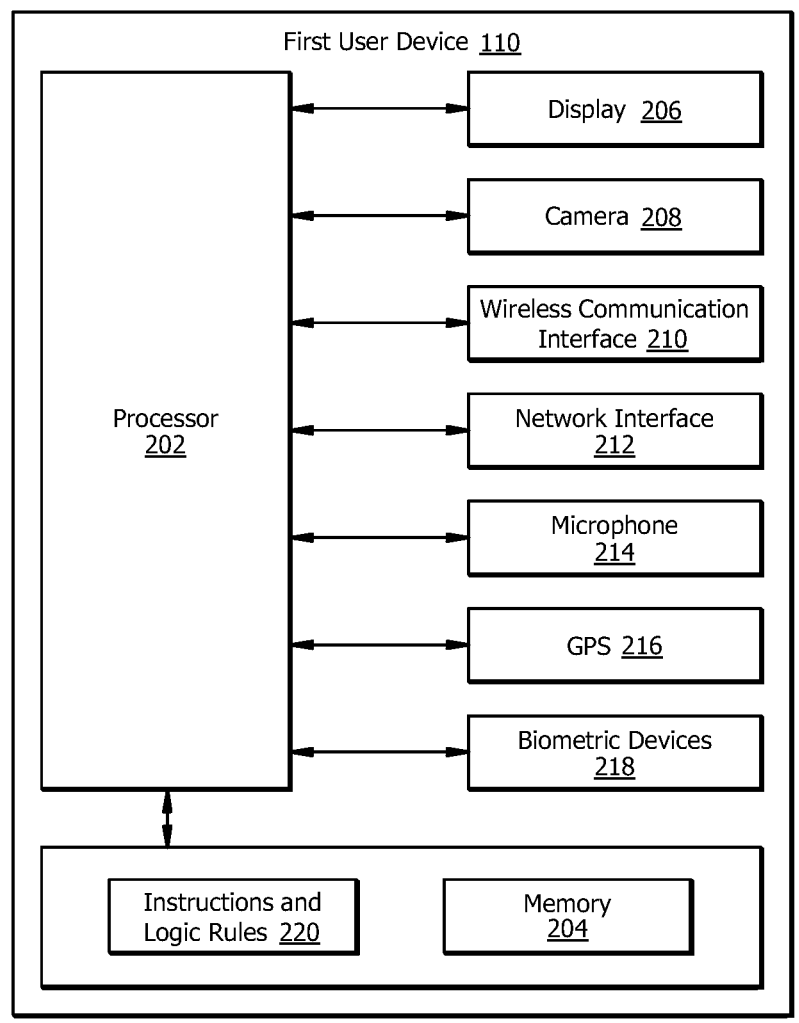
FIG. 2 is a block diagram of an embodiment of the first user device used by the system of FIG. 1.

FIG. 2 is a block diagram of an embodiment of the first user device 104 used by the system of FIG. 1. First user device 104 may be configured to display the first metaverse 102 (referring to FIG. 1) within a field of view of the first user 110 (referring to FIG. 1), capture biometric, sensory, and/or physical information of the first user 110 wearing the first user device 104, and to facilitate an electronic interaction between the first user 110 and the second user 112 (referring to FIG. 1).

First user device 104 comprises a processor 202, a memory 204, and a display 206. Further embodiments may include a camera 208, a wireless communication interface 210, a network interface 212, a microphone 214, a global position system (GPS) sensor 216, and/or one or more biometric devices 218. First user device 104 may be configured as shown or in any other suitable configuration. For example, first user device 104 may comprise one or more additional components and/or one or more shown components may be omitted.

The processor 202 comprises one or more processors operably coupled to and in signal communication with memory 204, display 206, camera 208, wireless communication interface 210, network interface 212, microphone 214, GPS sensor 216, and biometric devices 218. Processor 202 is configured to receive and transmit electrical signals among one or more of memory 204, display 206, camera 208, wireless communication interface 210, network interface 212, microphone 214, GPS sensor 216, and biometric devices 218. The electrical signals are used to send and receive data (e.g., images captured from camera 208, virtual objects to display on display 206, etc.) and/or to control or communicate with other devices. Processor 202 may be operably coupled to one or more other devices (for example, the real-world server 130 and/or virtual-world server 150 shown in FIG. 1).

The processor 202 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the function disclosed herein, such as some or all of those described with respect to FIGS. 1-5. For example, processor 202 may be configured to display virtual objects on display 206, detect hand gestures, identify virtual objects selected by a detected hand gesture, capture biometric information of a user, such as first user 110, via one or more of camera 208, microphone 214, and/or biometric devices 218, and communicate via wireless communication interface 210 with the real-world server 130, virtual-world server 150 and/or second user device 106. In some embodiments, the function described herein is implemented using logic units, FPGAs, ASICs, DSPs, or any other suitable hardware or electronic circuitry.

The memory 204 is operable to store any of the information described with respect to FIGS. 1-5 along with any other data, instructions, logic, rules, or code operable to implement the function(s) described herein when executed by processor 202. For example, the memory 204 may store the instructions 220. The memory 204 comprises one or more disks, tape drives, or solid-state drives, and may be used as an over-flow data storage device, to store programs when such programs are selected for execution, and to store instructions and data that are read during program execution. Memory 204 is operable to store, for example, information relating to the identity of the user (e.g., at least a portion of user data 132), instructions for performing the functions of first user device 104 described herein, and any other data or instructions. The memory 204 may be volatile or non-volatile and may comprise read-only memory (ROM), random-access memory (RAM), ternary content-addressable memory (TCAM), dynamic random-access memory (DRAM), and static random-access memory (SRAM).

Display 206 is configured to present visual information to a user (for example, first user 110 in FIG. 1) in a virtual reality environment, an augmented reality environment or mixed reality environment. In other embodiments, the display 206 is configured to present visual information to the user as a virtual environment (e.g., first metaverse 102 referring to FIG. 1) in real-time. In an embodiment, display 206 is a wearable optical display (e.g., glasses or a headset) configured to reflect projected images and enables a user to see through the display. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device. For example, the graphical display may be the display of a tablet or smart phone configured to display first metaverse 102.

Examples of camera 208 include, but are not limited to, charge-coupled device (CCD) cameras and complementary metal-oxide semiconductor (CMOS) cameras. Camera 208 is configured to capture images of a wearer of first user device 104, such as first user 110. Camera 208 may be configured to capture images continuously, at predetermined intervals, or on-demand. For example, camera 208 may be configured to receive a command from first user 110 to capture an image. In another example, camera 208 is configured to continuously capture images to form a video stream. Camera 208 is communicably coupled to processor 202.

Examples of wireless communication interface 210 include, but are not limited to, a Bluetooth interface, an RFID interface, a near field communication interface, a local area network (LAN) interface, a personal area network interface, a wide area network (WAN) interface, a Wi-Fi interface, a ZigBee interface, or any other suitable wireless communication interface as would be appreciated by one of ordinary skill in the art upon viewing this disclosure. Wireless communication interface 210 is configured to facilitate processor 202 in communicating with other devices. For example, wireless communication interface 210 is configured to enable processor 202 to send and receive signals with other devices, such as second user device 106, the real-world server 130 and/or virtual-world server 150 (referring to FIG. 1). Wireless communication interface 210 is configured to employ any suitable communication protocol.

The network interface 212 is configured to enable wired and/or wireless communications. The network interface 212 is configured to communicate data between the first user device 104 and other network devices, systems, or domain(s). For example, the network interface 212 may comprise a WIFI interface, a local area network (LAN) interface, a wide area network (WAN) interface, a modem, a switch, or a router. The processor 202 is configured to send and receive data using the network interface 212. The network interface 212 may be configured to use any suitable type of communication protocol as would be appreciated by one of ordinary skill in the art.

Microphone 214 is configured to capture audio signals (e.g., voice signals or commands) from a user, such as first user 110. Microphone 214 is configured to capture audio signals continuously, at predetermined intervals, or on-demand. Microphone 214 is communicably coupled to processor 202.

GPS sensor 216 is configured to capture and to provide geographical location information. For example, GPS sensor 216 is configured to provide a geographic location of a user, such as first user 110, employing first user device 104. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners, fingerprint scanners and facial scanners. Biometric devices 218 are configured to capture information about a person's physical characteristics and to output a biometric signal based on captured information. A biometric signal is a signal that is uniquely linked to a person based on their physical characteristics. For example, biometric device 218 may be configured to perform a retinal scan of the user's eye and to generate a biometric signal for the user based on the retinal scan. As another example, a biometric device 218 is configured to perform a fingerprint scan of the user's finger and to generate a biometric signal for the user based on the fingerprint scan. Biometric device 218 is communicably coupled to processor 202.

Referring back to FIG. 1, in one or more embodiments, one or both of the real-world server 130 and the virtual-world server 150, and one or more user devices (e.g., second user device 106) may be part of an Information Technology (IT) infrastructure of an entity or organization. For example, second user 112 may be a representative of the organization who may use the second user device 106 to enter the first metaverse 102 and virtually interact with one or more users (e.g., first user 110) via the second avatar 116 to provide services to the first user 110.

The real-world server 130 may be configured to allow users (e.g., first user 110) registered with the real-world server 130 to perform one or more data interactions in the real-world environment. Similarly, virtual-world server 150 may be configured to allow users (e.g., first user 110) registered with the virtual-world server 150 to perform one or more data interactions in the first metaverse 102. Additionally, as described below, virtual-world server 150 may be configured to allow users (e.g., first user 110) registered with the virtual-world server 150 to perform one or more data interactions in the second metaverse 120, third metaverse 122 and fourth metaverse 124. In one embodiment, the real-world server 130 and the virtual-world server 150 are owned and/or operated by the same entity/organization. In this context, virtual-world server 150 may be configured to allow users (e.g., first user 110) registered with the real-world server 130 to perform one or more data interactions in the first metaverse 102. In alternative embodiments, the real-world server 130 and the virtual-world server 150 may be owned and/or operated by different entities/organizations.

In one or more embodiments, as the first user 110 initially registers with the real-world server 130 in the real-world environment, the real-world server 130 may collect several pieces of information from the user including information relating to the identity of the user such as legal name, social security number, biometrics (e.g., fingerprints, retina scans, face ID etc.), residence address, phone numbers, digital assets owned by the user, and copies of government issued documents (e.g., driver license, state identity card etc.). This information is stored by real-world server 130 as part of user data 132 of the first user 110. In one embodiment, at least a portion of the user data 132 relating to the first user 110 collected in the real-world environment may be stored in the virtual-world server 150. Once the identity of the first user 110 is confirmed and all other information provided by the first user 110 is verified to be correct, the real-world server 130 may generate a real-world data file 134 for the first user 110 in which the first user 110 may store real-world data objects 136 owned by the first user 110. In one example, the first user 110 may engage in a real-world interaction with a service representative managing the real-world server 130 (e.g., physical interaction at an office location, over phone, voice chat etc.) to provide such information that can be used to register the first user 110 at the real-world server 130 and generate the real-world data file 134 of the first user 110. In another example, the first user 110 may engage in a real-world interaction by accessing a webpage provided and managed by the real-world server 130. Once the first user 110 initiates a registration process via the webpage, the real-world server 130 may walk the first user 110 through several steps in which the first user 110 may be asked to provide information necessary to verify the identity of the first user 110 and register the first user 110 with the real-world server 130.

Information relating to the real-world data file 134 of the first user 110 may be stored as part of the user data 132 of the first user 110. This information may include, but is not limited to, an identity of the real-world data file 134, amount of real-world data objects 136 stored in the real-world data file 134, a log of data interactions conducted in relation to the real-world data file 134 and any other information relating to the real-world data file 134.

Once registered with the real-world server 130, the real-world server 130 may allow the first user 110 to perform one or more data interactions in the real-world environment. For example, a real-world data interaction may include transferring one or more real-world data objects 136 from the real-world data file 134 of the first user 110 to a second real-world data file (not shown) of the second user 112. Another example data interaction may include receiving one or more real-world data objects 136 in the real-world data file 134 of the first user 110 from the second real-world data file of the second user 112. Another example data interaction may include requesting by the first user 110 transfer of real-world data objects from a data file of a second user to a data file of a third user as part of satisfying an agreement between the first user 110 and the third user. Another example data interaction may include modifying at least a portion of the user data 132 (e.g., user credentials to access the real-world server, phone numbers, residential address, email address, information relating to user assets etc.) stored at the real-world server 130. It may be noted that a data interaction in accordance with embodiments of the present disclosure refers to any interaction in the real-world environment and/or metaverse environment that includes transfer of data between computing nodes (e.g., first user device 104, second user device 106, real-world server 130 and virtual-world server 150).

The first user 110 may additionally register with the virtual-world server 150. In one embodiment, when initially registering with the virtual-world server 150, the first user 110 may provide to the virtual-world server 150 a credential (e.g., username and password) that provides the first user 110 access to the virtual-world server 150. For example, a single web page or web portal may allow the first user 110 to register with the real-world server 130 as well as the virtual-world server 150. The first user 110 may first register with the real-world server 130 as described above and generate credentials that allow the first user 110 access to the real-world server 130 and services provided by the real-world server 130. Once registered with the real-world server 130, the web portal may offer the first user 110 an option to additionally register with the virtual-world server 150 which may allow the first user 110 to perform data interactions in the first metaverse 102. Registration with the virtual-world server 150 may include generating a user credential 152 that allows the first user 110 to sign on to the virtual-world server 150 and enter the first metaverse 102 via first avatar 114 of the first user 110. Once registered the virtual-world server 150, the first user 110 may generate a virtual data file 160 in which the first user 110 may store virtual data objects 162 owned by the first user 110. In one or more embodiments, the virtual data file 160 of the first user 110 is associated with the real-world data file 134 of the first user 110. For example, the virtual data file 160 is a virtual image of the real-world data file 134, wherein the virtual data objects 162 correspond to the real-world data objects 136. In other words, the virtual data file 160 is a virtual representation of the real-world data file 134. In another example, the virtual data file 160 stores a portion of the real-world data objects 136 in the form of virtual data objects 162. In another example, real-world data objects 136 may be converted to virtual data objects 162, and vice-versa. In this case, there may not be a one-to-one conversion between the real-world data objects 136 and virtual data objects 162. For example, one real-world data object 136 may be converted to a plurality of virtual data objects 162, wherein the conversion ratio may dynamically change from time to time.

Information relating to the virtual data file 160 of the first user 110 may be stored by the virtual-world server 150. This information may include, but is not limited to, an identity of the virtual data file 160, amount of virtual data objects 162 stored in the virtual data file 160, a log of virtual data interactions conducted in the first metaverse 102 in relation to the virtual data file 160 and any other information relating to the virtual data file 160.

Once registered with the virtual-world server 150, the virtual-world server 150 may allow the first user 110 to perform one or more virtual data interactions. For example, a virtual data interaction may include transferring one or more virtual data objects 162 from the virtual data file 160 of the first user 110 to a second virtual data file (not shown) of the second user 112. Another example data interaction may include receiving one or more virtual data objects 162 in the virtual data file 160 of the first user 110 from the second virtual data file of the second user 112. Another example data interaction may include requesting by the first user 110 transfer of virtual data objects from a data file of a second user to a data file of a third user as part of satisfying an agreement between the first user 110 and the third user.

In one or more embodiments, a virtual data file 160 is a software application running on a computing node owned and/or operated by the respective user. For example, when the first user 110 desires to receive virtual data objects 162 from a second virtual data file of the second user 112, first user 110 may direct the second user 112 to a unique cryptographic address (e.g., public key) issued by the virtual data file 160. In one embodiment, the virtual data file 160 may not itself store the virtual data objects 162 but may store information that points to a location of the virtual data objects 162, for example, on a server (e.g., virtual-world server 150). Virtual data file 160 may be web-based or hardware-based. For example, virtual data file 160 may be stored in a mobile device or a desktop computer connected to the internet. Additionally or alternatively, virtual data file 160 may be stored in a device (e.g., USB drive) that is not connected to the network 180.

Data security is important in any system that supports online data interactions between computing nodes of the system. Online data interactions in real-world environments have existed for several decades and robust measures are already in place to ensure data security in real-world systems. However, metaverse technology is relatively new and data security is a challenge in metaverse systems as the development of metaverse related technologies is still at a nascent stage and standardized systems that provide robust data security are not yet in place. Embodiments of the present disclosure leverage user data collected and/or assigned in a real-world environment for providing data security in a metaverse environments.

In one or more embodiments, virtual-world server 150 may be configured to use a user credential 152 collected from the first user 110, generated by the first user 110 or assigned to the first user 110 during real-world data interactions with the first user 110, to verify identity of the first user 110 in the first metaverse 102. Thus, the user credential 152 provides the first user 110 access to the first metaverse 102. For example, the user credential 152 may be used by the virtual-world server 150 to verify that the first avatar 114 belongs to and is controlled by the first user 110.

In one example, a retina scan of the first user 110 may have been previously collected from the first user 110 as part of a real-world data interaction with the first user 110. Information relating to the retina scan may have been stored as part of the user data 132. The retina scan of the first user 110 may be used as the user credential 152. When the first user 110 uses the user device 104 (e.g., VR headset) to enter the first metaverse 102 via first avatar 114, the virtual-world server 150 obtains a retina scan of the first user 110 using a biometric device (e.g., biometric device 218) provided at the user device 104. The retina scan obtained via the user device is compared with the retina scan of the first user 110 stored as part of user data 132 in the real-world server 130. When the two retina scans match, virtual-world server 150 determines that the first avatar 114 is associated with the first user 110 and may authorize and allow the first avatar 114 to enter the first metaverse 102.

In another example, user credential 152 may include a username and password generated by the first user 110 as part of registering with the real-world server 130 and/or virtual-world server 150. The virtual-world server 150 may allow the first user 110 to use the username and password to enter the first metaverse 102 via first avatar 114.

Virtual-world server 150 may be configured to allow the first user 110 to access one or more secondary metaverse environments (e.g., second metaverse 120, third metaverse 122 and fourth metaverse 124) through the first metaverse 102. Each of the second metaverse 120, the third metaverse 122 and the fourth metaverse 124 may be managed by their respective servers (not shown) connected to the network 180, wherein virtual-world server 150 may be communicatively coupled to each of the servers via network 180. Essentially, first metaverse 102 may act as a single portal that allows first user 110 access the second metaverse 120, the third metaverse 122 and the fourth metaverse 124 using a single user identity associated with the first user 110.

First user 110 may first request the virtual-world server 150 to provide access to the first metaverse 102, wherein requesting access to the first metaverse 102 may include providing the user credential 152 previously setup with the virtual-world server 150. Upon receiving the request from the first user 110, virtual-world server 150 may verify the user credential 152 and authorize the first user 110 to enter the first metaverse 102 through the first avatar 114.

After gaining access to the first metaverse 102, first user 110 may request the virtual-world server 150 access to any one of the second metaverse 120, third metaverse 122 and fourth metaverse 124. For example, first user 110 may request to access the second metaverse 120. Upon receiving the request, virtual-world server 150 may determine whether the first user 110 is authorized to access the second metaverse 120. For example, the first user 110 may have pre-registered with the virtual-world server 150 to access the second metaverse 120 through the first metaverse 102. As part of registering to access the second metaverse 120 through the first metaverse 102, the first user 110 may have generated or provided a login credential 154 that provides the first user access to the second metaverse 120. In one embodiment, as part of registering the first user 110 to access the second metaverse 120 through the first metaverse 102, virtual-world server 150 may negotiate with a server that manages the second metaverse 120 to agree upon the login credential 154 that provides the first user 110 access to the second metaverse 120. In an alternative embodiment, the first user 110 may independently register with the server that manages the second metaverse 120 and generate the login credential 154 as part of the registration. Once independently registered to access the second metaverse 120, the first user 110 may provide the pre-generated login credential 154 to the virtual-world server 150 when registering with the virtual-world server 150 to access the second metaverse 120 through the first metaverse 102. Virtual-world server 150 may be configured to store a login credential 154 associated with each of the second metaverse 120, the third metaverse 122 and the fourth metaverse 124, wherein a login credential 154 provides access to the respective metaverse. In one embodiment, a same login credential 154 may be used to access two or more secondary metaverses through the first metaverse 102.

If the first user 110 is pre-registered with the virtual-world server 150 to access the second metaverse 120 through the first metaverse 102, virtual-world server 150 may determine that the first user 110 is authorized to access the second metaverse 120 through the first metaverse 102. In response to determining that that first user 110 is authorized to access the second metaverse 120, virtual-world server 150 may be configured to generate a virtual pass 156 for the first user 110 to enter the second metaverse 120 through the first metaverse 102. The virtual pass 156 may include the login credential 154 that provides the first user 110 access to the second metaverse 120. The first user 110 may enter the second metaverse 120 using the virtual pass 156. In one embodiment, virtual-world server 150 may transmit the virtual pass 156 to the server that manages the second metaverse 120 and receive authorization from the server for the first user 110 to enter the second metaverse 120.

Once the first user 110 enters the second metaverse 120, first user 110 may perform one or more virtual data interactions within the second metaverse 120. In one embodiment, virtual data interactions performed within the second metaverse 120 may be managed by a server that manages the second metaverse 120. Virtual data interactions performed in the second metaverse may be same as or similar to the virtual data interactions the first user 110 may perform in the first metaverse 102 as described above. For example, virtual data interactions that may be performed in the second metaverse 120 may include, but are not limited to, one or more of transferring virtual data objects to a second user or virtual entity in the second metaverse 120, receiving virtual data objects from a second user or virtual entity in the second metaverse 120, transferring other digital assets to a second user or virtual entity in the second metaverse 120, and receiving other digital assets from a second user or virtual entity in the second metaverse 120.

It may be noted the discussion in accordance with embodiments of the present disclosure related to the first user 110 entering the second metaverse 120 through the first metaverse 102 and performing data interactions within the second metaverse 120 applies to the first user 110 entering other metaverses (e.g., third metaverse 122 and fourth metaverse 124) through the first metaverse 102 and perform same or similar data interactions in the respective metaverses.

Managing Virtual Avatars for Multiple Metaverse Environments

Virtual-world server 150 may be configured to manage a plurality of avatars for the first metaverse 102 and the secondary virtual environments (e.g., second metaverse 120, third metaverse 122 and fourth metaverse 124), and may allow the first user 110 to use in a metaverse one or more avatars configured for use in the metaverse. For example, virtual-world server 150 may be configured to store avatar configurations 164 associated with avatars the first user 110 can use in the first metaverse 102 and each of the secondary metaverses (e.g., second metaverse 120, third metaverse 122 and fourth metaverse 124). In one example, after entering the first metaverse 102 using the user credential 152, the first user 110 may request the virtual-world server 150 to enter the second metaverse 120 through the first metaverse 102. After determining that that first user 110 is authorized to access the second metaverse 120, virtual-world server 150 may be configured to select an avatar configuration 164 configured for use in the second metaverse 120. The selection of the avatar configuration 164 may include selecting an avatar configuration 164 pre-selected to be used for the second metaverse 120 (e.g., by first user 110) or selecting a default avatar configuration 164. Virtual-world server 150 may be configured to generate an avatar for the first user 110 based on the selected avatar configuration 164 associated with the second metaverse 120. Generating the avatar may include rendering the avatar according to the selected avatar configuration 164 for display to the first user 110 on the first user device 104 (e.g., on display 206 of the first user device 104). Virtual-world server 150 may generate a virtual pass 156 for the first user 110 to enter the second metaverse 120 through the first metaverse 102 using the avatar generated for the second metaverse 120.

An avatar configuration 164 may include a user configuration 166 and a technology configuration 168. A user configuration 166 may include a definition of one or more attributes related to an avatar as defined by the first user 110. An attribute related to an avatar may include a visual characteristic that decides a look and feel of the avatar in a metaverse. Example attributes include, but are not limited to a form, size, shape, color, attire, accessories, or any other suitable type of appearance features specified by the first user 110. Generating an avatar associated with a metaverse (e.g., second metaverse 120) based on a selected avatar configuration 164 may include generating one or more attributes of the avatar based on the user configuration 166 included in the avatar configuration 164.

A technology configuration 168 associated with a metaverse may include a technology specific configuration based on the technology used by the metaverse for rendering the avatar in the metaverse. Different metaverses may use different underlying technologies to generate the respective virtual environments of the metaverses and the components (e.g., avatars, rooms, buildings, objects etc.) within the metaverses. For example, the technologies used by one or more of the first metaverse 102, second metaverse 120, third metaverse 122 and fourth metaverse 124 may differ in one or more technology attributes including, but not limited to, pixel rendering, color composition, vertical and horizontal resolutions, RGB composition and other attributes related to the technology used for image rendering and optimization by the respective metaverse and/or the device (e.g., first user device 104) being used to render the virtual environment. A technology configuration 168 associate with a secondary metaverse (e.g., second metaverse 120) may be generated by the virtual-world server 150 or downloaded from respective server that manages the secondary metaverse. Generating an avatar associated with a metaverse (e.g., second metaverse 120) based on a selected avatar configuration 164 may include adapting the avatar to the technology used by the metaverse according to the technology attributes defined in the technology configuration 168 included in the avatar configuration 164.

In one or more embodiments, virtual-world server 150 may store multiple avatar configurations 164 associated with a metaverse (e.g., second metaverse 120), wherein each avatar configuration 164 associated with the metaverse is for a different avatar configured for use in the metaverse. For example, the first user 110 may want to use an avatar that suits an activity or interaction the first user 110 intends to perform in the second metaverse 120. For example, the first user 110 may want to use a human avatar that is dressed professionally when attending a meeting or conference in the second metaverse 120. On the other hand, the first user 110 may want to use a human avatar that is dressed casually or semi-casually when attending a virtual movie or concert in the second metaverse 120. In this context, each of the multiple avatar configurations 164 associated with a particular metaverse (e.g., second metaverse 120) may include a different user configuration 166 defining a unique set of visual characteristics for the respective avatar. The technology configuration 168, however, may remain the same across all user configurations 166 defined for a particular metaverse as the same technology attributes apply to a metaverse regardless of the visual characteristics of the avatar. In one embodiment, virtual-world server 150 may allow the first user 110 to select from two or more avatar configurations 164 for use in the second metaverse 120, wherein each avatar configuration 164 associated with the second metaverse 120 includes a different user configuration 166. Virtual-world server 150 may be configured to receive a selection of an avatar configuration 164 from the first user 110 and may generate the avatar based on the unique set of visual characteristics defined by the respective user configuration 166 included in the selected avatar configuration 164.

Virtual-world server 150 may allow the first user 110 to provide the user configuration 166 to be associated with a metaverse. For example, first user 110 may use the first user device 104 to generate a user configuration 166 that defines one or more characteristics of an avatar. The first user 110 may send the user configuration 166 to the virtual-world server 150 and request that the user configuration 166 be made available for use in the second metaverse 120. Upon receiving the request, virtual-world server 150 may store the user configuration 166 received from the first user 110 and a technology configuration 168 of the second metaverse 120 as an avatar configuration 164 associated with the second metaverse 120.

One or more avatar configurations 164 associated with a metaverse (e.g., second metaverse 120) may include default avatar configurations that defines default avatars which may be used when there are no user-defined avatar configurations (e.g., including user configurations 166) or the first user 110 has not selected an avatar configuration 164 that includes a user configuration 166 for use in the metaverse. Virtual-world server 150 may be configured to select a default avatar configuration when the first user 110 does not select an avatar configuration 164 that includes a user configuration 166. The default avatar configuration associated with a metaverse may be generated by the virtual-world server 150 or be downloaded from a server that manages the metaverse. In embodiment, the first user may define a default avatar configuration or select an avatar configuration 164 for use as a default avatar configuration.

In one or more embodiments, virtual-world server 150 may be configured to allow the first user 110 to define a common user configuration 166 to be used across multiple metaverses. For example, the first user 110 may define a common user configuration 166 that is to apply to the second metaverse 120 and the third metaverse 122. Upon receiving the common user configuration 166 from the first user 110, virtual-world server 150 may generate or obtain technology configurations for the second metaverse 120 and the third metaverse 122. For example, virtual-world server 150 may generate or obtain a first technology configuration associated with the second metaverse 120 and may generate or obtain a second technology configuration associated with the third metaverse 122. Virtual-world server 150 may generate an avatar configuration 164 for each of the second metaverse 120 and the third metaverse 122 that includes the common user configuration 166 and the respective technology configuration 168. For example, virtual-world server 150 may generate a first avatar configuration for the second metaverse 120 that includes the common user configuration 166 and the first technology configuration. Similarly, virtual-world server 150 may generate a second avatar configuration for the third metaverse 122 that includes the common user configuration 166 and the second technology configuration. Virtual-world server 150 may store the first and second avatar configurations for later use in generating avatars for the second metaverse 120 and the third metaverse 122. Thus, virtual-world server 150 may adapt a single user configuration 166 for use over multiple metaverse environments.

Managing Digital Assets for Multiple Metaverse Environments

Virtual-world server 150 may store a plurality of digital assets 158 associated with the first user 110. Digital assets 158 associated with the first user 110 may include, but are not limited to, pictures, documents, videos, digital books, audio files, illustrations, manuscripts, emails and other digital content. Virtual-world server 150 may be configured to allow first user 110 to perform virtual data interactions associated with one or more digital assets 158 in any of the metaverses (e.g., first metaverse 102, second metaverse 120, third metaverse 122 and fourth metaverse 124). A data interaction associated with a digital asset 158 may include, but is not limited to, transferring the digital asset 158 to another user or virtual entity, receiving the digital asset 158 from another user or virtual entity, updating or modifying at least a portion of the digital asset 158 or converting at least a portion of the digital asset 158 into virtual data objects 162. Traditionally, when a data interaction (e.g., send, receive, update etc.) is performed in relation to a digital asset 158 within a metaverse, the digital asset 158 or the updated digital asset 158 is stored in the metaverse (e.g., at a server managing the metaverse) within which the data interaction was performed. When the user has access to several metaverses, digital assets associated with the user may be spread across the several metaverses. Generally, a digital asset stored in one metaverse may not be accessed in another metaverse. Embodiments of the present disclosure allow a user (e.g., first user 110) to access a digital asset associated with the user from a plurality of metaverses. For example, instead of storing portions of the digital assets 158 associated with the first user 110 in different metaverses (e.g., at servers managing the respective metaverses), all digital assets 158 associated with the first user 110 are stored in the first metaverse 102 (e.g., at the virtual-world server 150 that manages the first metaverse 102). Virtual-world server 150 may be configured to provide the first user 110 access to the digital assets 158 from any of the metaverses (e.g., first metaverse 102, second metaverse 120, third metaverse 122 and fourth metaverse 124). Further, as described below, a digital asset 158 stored at the virtual-world server 150 may be updated to reflect a data interaction performed in relation to the digital asset 158 in a metaverse. This avoids duplicate data interactions from being performed in relation to the same digital asset 158 and helps ensure that a most recent version of the data asset is available for use in any of the metaverses.

For example, after the first user 110 gains access to the second metaverse 120 through the first metaverse 102 as described above, the first user 110 may request the virtual-world server 150 to perform within the second metaverse 120 a virtual data interaction in relation to a digital asset 158 stored at the virtual-world server 150. Upon receiving the request from the first user 110, virtual-world server 150 may provide the first user 110 (e.g., first avatar 114) access to the digital asset 158 from the second metaverse 120. Once access to the digital asset 158 is provided, data interactions associated with the digital asset 158 may be performed in the second metaverse 120 as if the digital asset 158 is stored in the second metaverse 120. For example, first user 110 may perform a data interaction associated with the digital asset 158 in the second metaverse 120. When the data interaction is completed in the second metaverse 120, virtual-world server 150 may receive an indication that the data interaction has been completed in the second metaverse 120. In response, virtual-world server 150 may update the digital asset 158 stored in at the virtual-world server 150 to reflect a result of the data interaction in the second metaverse 120.

In one embodiment, the data interaction associated with the digital asset 158 as performed by the first user 110 in the second metaverse 120 may include transferring the digital asset 158 to another user or virtual entity within the second metaverse 120. In response to receiving an indication that the transfer of the digital asset 158 has been completed in the second metaverse 120, virtual-world server 150 may delete the digital asset 158 from the virtual-world server 150 so that the digital asset 158 is not available for subsequent use by the first user 110 in any of the metaverses.

In one embodiment, the data interaction associated with the digital asset 158 as performed by the first user 110 in the second metaverse 120 may include updating at least a portion of the digital asset 158 in the second metaverse 120. For example, the digital asset 158 may be a digital book and the data interaction may include adding one or more pages, deleting one or more pages and/or editing one or more pages of the book. In response to receiving an indication that the update to the portion of the digital asset 158 (e.g., digital book) has been completed in the second metaverse 120, virtual-world server 150 may make the same update to the copy of the digital asset 158 (e.g., digital book) saved at the virtual-world server 150. For example, virtual-world server 150 may perform an update to the portion of the digital asset 158 stored at the virtual-world server 150 that corresponds to (e.g., is same as) the update made to the portion of the digital asset 158 in the second metaverse 120. In an alternative embodiment, virtual-world server 150 may receive a copy of the updated digital asset 158 from the second metaverse 120 and replace the digital asset 158 stored at the virtual-world server 150 with the updated copy of the digital asset 158.

Virtual-world server 150 may be configured to convert at least a portion of a digital asset 158 into one or more virtual data objects 162. The converted virtual data objects 162 may be used as part of a virtual data interaction in a metaverse. This technique may be useful, for example, when the first user 110 does not have sufficient virtual data objects 162 stored in virtual data file 160 of the first user 110 to complete the data interaction. For example, after gaining access to the second metaverse 120 through the first metaverse 102, first user 110 may initiate transfer of a selected amount of virtual data objects 162 to another user (e.g., second user 112) or virtual entity within the second metaverse 120. However, the first user 110 may not have sufficient virtual data objects 162 in the virtual data file 160 to complete the data interaction. In this case, virtual-world server 150 may be configured to convert at least a portion of a digital asset 158 into virtual data objects 162 and store the converted virtual data objects in the virtual data file 160 for use in the data interaction. In this context, it may be noted that different digital assets 158 may be converted into different amounts of virtual data objects 162 depending upon a value associated with the digital assets 158. In one embodiment, when the virtual data file 160 has less than the second amount of virtual data objects 162, virtual-world server 150 may be configured to convert a first portion of the digital asset 158 to make up for the difference between the second amount of virtual data objects needed for the data interaction and the amount of virtual data objects stored in the virtual data file 160. In an alternative embodiment, when the virtual data file 160 does not have any virtual data objects 162, virtual-world server 150 may be configured to convert a second larger portion of the digital asset 158 to virtual data objects 162 that equal the second amount of virtual data objects 162 needed for the data interaction. Virtual-world server may be configured to store the converted virtual data objects 162 in the virtual data file 160. After completing the conversion of the digital asset 158 or portion thereof to virtual data objects 162, virtual-world server 150 may update a value associated with the digital asset 158 stored at the virtual-world server 150 to reflect the conversion. For example, virtual-world server 150 may subtract a value of the converted portion of the digital asset 158 from the total value of the digital asset 158. Once a sufficient amount of the virtual data objects 162 is stored in the virtual data file 160, first user 110 may complete the transfer of the second amount of virtual data objects 162 in the second metaverse 120. Once the virtual-world server 150 receives an indication that the transfer of virtual data objects is completed in the second metaverse 120, virtual-world server 150 may delete the transferred virtual data objects 162 from the virtual data file 160 so that the first user 110 may not perform a subsequent data interaction using the transferred virtual data objects 162.

After a digital asset 158 has been updated as a result of a data interaction performed in the second metaverse 120, when the first user 110 places a subsequent request to perform another data interaction associated with the same digital asset 158, virtual-world server 150 may be configured to provide the first user 110 access to the updated digital asset 158.

In one or more embodiments, the first user 110 may receive a digital asset 158 as part of performing a data interaction in a metaverse (e.g., second metaverse 120). In this context, the virtual-world server 150 may be configured to store the received digital asset 158 at the virtual-world server 150 for use by the first user 110 in a subsequent data interaction in any one the metaverses.

Managing Digital Objects for Multiple Metaverse Environments

Different metaverse environments may support different types of virtual data objects 162 and virtual data interactions must be performed within a particular metaverse using the type of virtual data objects supported by the metaverse. For example, first metaverse 102 may support virtual data objects 162 of a first type, second metaverse 120 may support virtual data objects 162 of a second type, third metaverse 122 may support virtual data objects 162 of a third type, and fourth metaverse 124 may support virtual data objects 162 of a fourth type. Thus, virtual data interactions involving virtual data objects 162 performed in each of these metaverses may need to be performed using virtual data objects 162 of a respective type supported by the metaverse. For example, data interactions performed in the first metaverse 102 must be performed using virtual data objects 162 of the first type, data interactions performed in the second metaverse 120 must be performed using virtual data objects 162 of the second type, data interactions performed in the third metaverse 122 must be performed using virtual data objects 162 of the third type, and data interactions performed in the fourth metaverse 124 must be performed using virtual data objects 162 of the fourth type. A metaverse may not support data interactions performed in the metaverse using virtual data objects 162 of a type not supported by the metaverse. Traditionally, a user (e.g., first user 110) who operates several metaverses may need to separately maintain different types of virtual data objects in respective metaverses to perform data interactions within those metaverses.

Embodiments of the present disclosure allow a user (e.g., first user 110) to maintain virtual data objects of several types in a single metaverse platform (e.g., first metaverse 102) and perform virtual data interactions in a plurality of metaverses using virtual data objects of the respective supported type from the single metaverse platform. Further, the disclosed embodiments allow a user to convert between virtual data objects of different types in the single metaverse platform to support data interactions in plurality of metaverses.

Virtual-world server 150 may be configured to store virtual data objects 162 of one or more types, wherein virtual data objects 162 of each type stored at the virtual-world server 150 is supported by at least one of the first metaverse 102, second metaverse 120, third metaverse 122 and fourth metaverse 124. For example, virtual data objects 162 stored in the virtual data file 160 may include virtual data objects 162 of one or more types. In one embodiment, virtual data file 160 may store one or more virtual data objects 162 of each type supported by the first metaverse 102, second metaverse 120, third metaverse 122 and fourth metaverse 124. In other words, a first portion of the virtual data objects 162 stored in the virtual data file 160 correspond to the first type supported by the first metaverse 102, a second portion of the virtual data objects 162 correspond to the second type supported by the second metaverse 120, a third portion of the virtual data objects 162 correspond to the third type supported by the third metaverse 122, and a fourth portion of the virtual data objects 162 correspond to the fourth type supported by the fourth metaverse 124. In one example, after the first user 110 gains access to the second metaverse 120 through the first metaverse 102 as described above, the first user 110 may request the virtual-world server 150 to perform within the second metaverse 120 a virtual data interaction including transferring a selected amount of virtual data objects 162 of the second type to a second user (e.g., second user 112) or a virtual entity in the second metaverse 120. Upon receiving the request from the first user 110, virtual-world server 150 may transfer to the second metaverse 120 the selected amount of virtual data objects 162 of the second type from the virtual data file 160 for use in the requested data interaction. When the transfer is completed in the second metaverse 120, virtual-world server 150 may receive an indication that the data interaction has been completed in the second metaverse 120. In response, virtual-world server 150 may update the virtual data file 160 to reflect the transfer of virtual data objects of the second type. For example, virtual-world server 150 may delete the second amount of virtual data objects 162 of the second data type from the virtual data file 160.

In certain embodiments, virtual data file 160 may not store virtual data objects 162 of a type supported by one of the secondary metaverses accessible through the first metaverse 102. For example, virtual data file 160 may not store virtual data objects 162 of the third type supported by the third metaverse 122. In one example, after the first user 110 gains access to the third metaverse 122 through the first metaverse 102, the first user 110 may request the virtual-world server 150 to perform within the third metaverse 122 a virtual data interaction including transferring a selected amount of virtual data objects 162 of the third type to a second user (e.g., second user 112) or a virtual entity in the third metaverse 122. Upon receiving the request from the first user 110, virtual-world server 150 may determine that the virtual data file 160 does not store virtual data objects 162 of the third type. In response, virtual-world server 150 may be configured to convert virtual data objects 162 of one or more other types not supported by the third metaverse 122 to the selected amount of virtual data objects of the third type needed for the transfer. For example, virtual-world server 150 may convert an equivalent portion of virtual data objects 162 of the second type stored in the virtual data file 160 to generate the second amount of virtual data objects 162 of the third type. Virtual-world server 150 may transfer to the third metaverse 122 the converted selected amount of virtual data objects 162 of the third type for use in the requested data interaction. When the transfer is completed in the third metaverse 122, virtual-world server 150 may receive an indication that the data interaction has been completed in the third metaverse 122. In response, virtual-world server 150 may update the virtual data file 160 to reflect the transfer of the equivalent amount (e.g., equivalent to the selected amount of virtual data objects of the third type) of the virtual data objects of the second type from the virtual data file 160. For example, virtual-world server 150 may delete the converted amount of virtual data objects 162 of the second type from the virtual data file 160.

Following the example discussed in the previous paragraph, the virtual data file 160 may not store a sufficient amount of virtual data objects 162 of any single type such that an equivalent amount of virtual data objects 162 of a single type may be converted to the required selected amount of virtual data objects 162 of the third type. In such a case, upon determining that the virtual data file 160 does not store sufficient amount of virtual data objects 162 of any single type for the conversion, virtual-world server 150 may be configured to convert virtual data objects 162 of two or more types to the selected amount of virtual data objects 162 of the third type. For example, virtual-world server 150 may convert a portion of virtual data objects of the second type and a portion of the virtual data objects 162 of the fourth type to generate the selected amount of virtual data objects 162 of the third type. Virtual-world server 150 may transfer to the third metaverse 122 the converted selected amount of virtual data objects 162 of the third type for use in the requested data interaction. When the transfer is completed in the third metaverse 122, virtual-world server 150 may receive an indication that the data interaction has been completed in the third metaverse 122. In response, virtual-world server 150 may update the virtual data file 160 to reflect the transfer of the virtual data objects 162 of the third type. For example, virtual-world server 150 may delete the converted amounts of virtual data objects 162 of the second type and fourth type from the virtual data file 160.

Following the example discussed in the previous paragraph, the virtual data file 160 may include virtual data objects 162 of the third type but in an insufficient amount to fulfil the requested data transfer in the third metaverse 122. In such a case, upon determining that the virtual data file 160 stores an insufficient amount of virtual data objects 162 of the third type to fulfil the requested data interaction, virtual-world server 150 may be configured to convert virtual data objects 162 of one or more other types not supported by the third metaverse 122 to make up for the difference between the selected amount of virtual data objects 162 of the third type needed for the data interaction and the amount of virtual data objects 162 of third type stored in the virtual data file 160. For example, virtual-world server 150 may convert a portion of virtual data objects 162 of the second type stored in the virtual data file 160 to make up for the difference. Virtual-world server 150 may add (e.g., store) the converted amount of virtual data objects 162 of the third type to the virtual data file 160. Once the virtual data file 160 has the required selected amount of virtual data objects 162 of the third type needed for the data transfer, the virtual-world server 150 may transfer to the third metaverse 122 the selected amount of virtual data objects 162 of the third type for use in the requested data interaction. When the transfer is completed in the third metaverse 122, virtual-world server 150 may receive an indication that the data interaction has been completed in the third metaverse 122. In response, virtual-world server 150 may update the virtual data file 160 to reflect the transfer of the selected amount of the virtual data objects of the third type from the virtual data file 160. For example, virtual-world server 150 may delete the converted amount of virtual data objects 162 of the second type as well as the virtual data objects 162 of the third type from the virtual data file 160.

In one or more embodiments, the first user 110 may receive virtual data objects 162 as part of performing a data interaction in a metaverse. For example, virtual-world server 150 may receive an indication that the first user 110 has received one or more virtual data objects 162 of the second type as part of a data interaction performed in the second metaverse 120. In this context, the virtual-world server 150 may be configured to store the received virtual data objects 162 of the second type in the virtual data file 160 for use by the first user 110 in a subsequent data interaction in the second metaverse 120 or any of the other metaverses after appropriate conversion as described above.

In an example banking use case, the system and methods disclosed in accordance with embodiments of the present disclosure may allow a user (e.g., first user 110) to access one or more secondary metaverses (e.g., second metaverse 120, third metaverse 122 and fourth metaverse 124) through a single bank metaverse platform (e.g., first metaverse 102) perform digital currency transactions in the secondary metaverses. In this context, the real-world server 130 and virtual-world server 150 may be owned and/or operated by a bank, wherein the virtual-world server 150 manages the bank metaverse platform (e.g., first metaverse 102). The real-world data file 134 may correspond to a real-world bank account of the first user 110 and the real-world data objects 136 may correspond to the real-world funds in the bank account of the first user 110. Similarly, virtual data file 160 may correspond to a digital wallet of the first user 110 and the virtual data objects 162 may correspond to digital currency owned by the first user 110. User data 132 may include information relating to the bank account of the first user and other information relating to a user profile of the user at the bank. Virtual data objects 162 of the first type, second type, third type and fourth type may correspond to respective types of digital currencies supported by the first, second, third and fourth metaverses.

Figure 3:
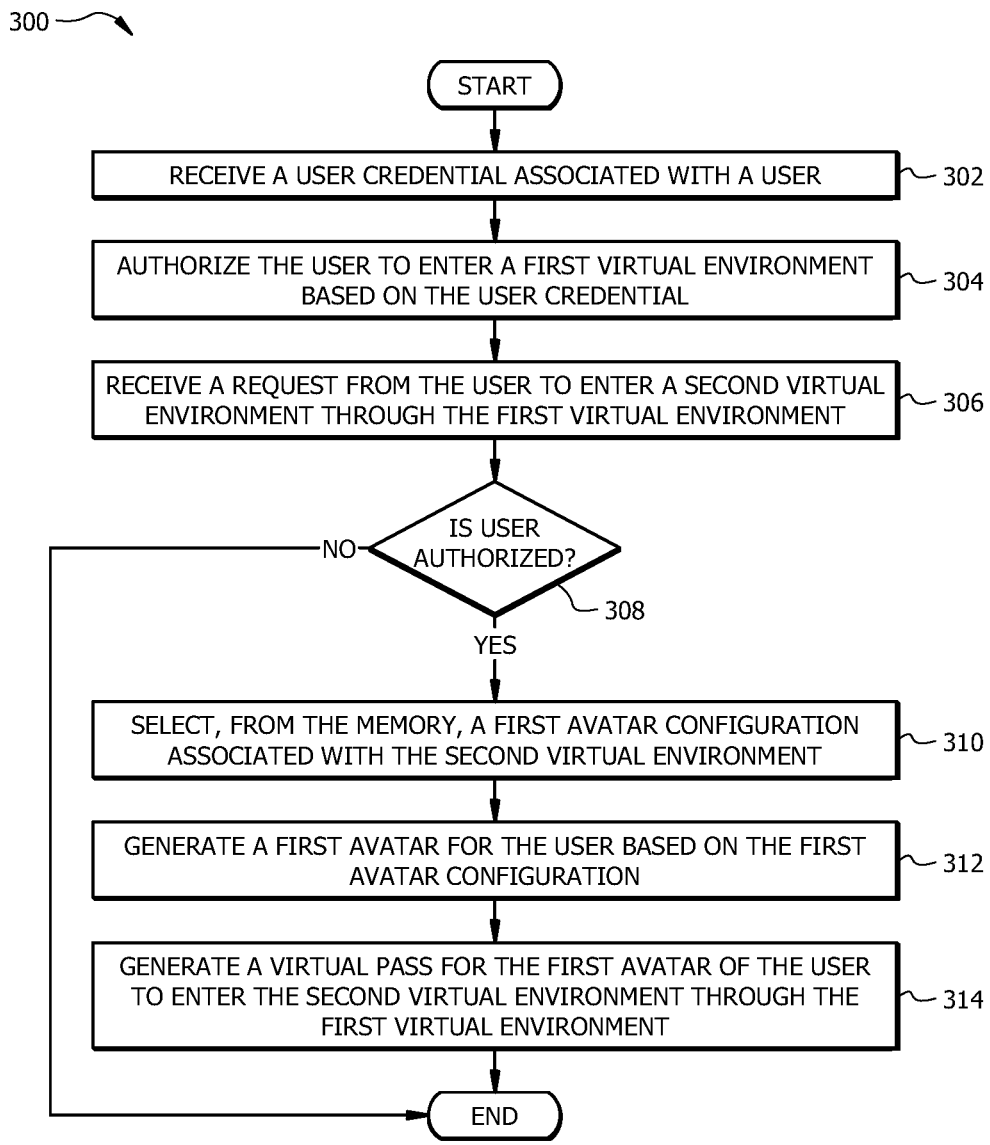
FIG. 3 illustrates a flowchart of an example method for managing digital avatars of a user in multiple metaverse environments, in accordance with one or more embodiments of the present disclosure.

FIG. 3 illustrates a flowchart of an example method 300 for managing digital avatars of a user in multiple metaverse environments, in accordance with one or more embodiments of the present disclosure. Method 300 may be performed by the virtual-world server 150 shown in FIG. 1.

At operation 302, virtual-world server 150 receives a user credential 152 associated with a user (e.g., first user 110).

As described above, virtual-world server 150 may be configured to use a user credential 152 collected from the first user 110, generated by the first user 110 or assigned to the first user 110 during real-world data interactions with the first user 110, to verify identity of the first user 110 in the first metaverse 102. Thus, the user credential 152 provides the first user 110 access to the first metaverse 102. For example, the user credential 152 may be used by the virtual-world server 150 to verify that the first avatar 114 belongs to and is controlled by the first user 110.

In one example, a retina scan of the first user 110 may have been previously collected from the first user 110 as part of a real-world data interaction with the first user 110. Information relating to the retina scan may have been stored as part of the user data 132. The retina scan of the first user 110 may be used as the user credential 152. When the first user 110 uses the user device 104 (e.g., VR headset) to enter the first metaverse 102 via first avatar 114, the virtual-world server 150 obtains a retina scan of the first user 110 using a biometric device (e.g., biometric device 218) provided at the user device 104. The retina scan obtained via the user device is compared with the retina scan of the first user 110 stored as part of user data 132 in the real-world server 130. When the two retina scans match, virtual-world server 150 determines that the first avatar 114 is associated with the first user 110 and may authorize and allow the first avatar 114 to enter the first metaverse 102.

In another example, user credential 152 may include a username and password generated by the first user 110 as part of registering with the real-world server 130 and/or virtual-world server 150. The virtual-world server 150 may allow the first user 110 to use the username and password to enter the first metaverse 102 via first avatar 114.

At operation 304, virtual-world server 150 authorizes the first user 110 to access a first virtual environment (e.g., first metaverse 102) based on the user credential 152.

As described above, first user 110 may first request the virtual-world server 150 to provide access to the first metaverse 102, wherein requesting access to the first metaverse 102 may include providing the user credential 152 previously setup with the real-world server 130 and/or virtual-world server 150. Upon receiving the request from the first user 110, virtual-world server 150 may verify the user credential 152 and authorize the first user 110 to enter the first metaverse 102 through the first avatar 114.

At operation 306, virtual-world server 150 receives a request from the first user 110 to enter a second virtual environment (e.g., second metaverse 120) accessible through the first virtual environment (e.g., first metaverse 102).

As described above, virtual-world server 150 may be configured to allow the first user 110 to access one or more secondary metaverse environments (e.g., second metaverse 120, third metaverse 122 and fourth metaverse 124) through the first metaverse 102. Each of the second metaverse 120, the third metaverse 122 and the fourth metaverse 124 may be managed by their respective servers connected to the network 180, wherein virtual-world server 150 may be communicatively coupled to each of the servers via network 180. Essentially, first metaverse 102 may act as a single portal that allows first user 110 access the second metaverse 120, the third metaverse 122 and the fourth metaverse 124 using a single user identity associated with the first user 110. After gaining access to the first metaverse 102, first user 110 may request the virtual-world server 150 access to any one of the second metaverse 120, third metaverse 122 and fourth metaverse 124. For example, first user 110 may request to access the second metaverse 120.

At operation 308, virtual-world server 150 determines whether the first user 110 is authorized to access the second virtual environment (e.g., second metaverse 120) through the first virtual environment (e.g., first metaverse 102).

As described above, upon receiving the request to access the second metaverse 120 through the first metaverse 102, virtual-world server 150 may determine whether the first user 110 is authorized to access the second metaverse 120. For example, the first user 110 may have pre-registered with the virtual-world server 150 to access the second metaverse 120 through the first metaverse 102. As part of registering to access the second metaverse 120 through the first metaverse 102, the first user 110 may have generated or provided a login credential 154 that provides the first user access to the second metaverse 120. In one embodiment, as part of registering the first user 110 to access the second metaverse 120 through the first metaverse 102, virtual-world server 150 may negotiate with a server that manages the second metaverse 120 to agree upon the login credential 154 that provides the first user 110 access to the second metaverse 120. In an alternative embodiment, the first user 110 may independently register with the server that manages the second metaverse 120 and generate the login credential 154 as part of the registration. Once independently registered to access the second metaverse 120, the first user 110 may provide the pre-generated login credential 154 to the virtual-world server 150 when registering with the virtual-world server 150 to access the second metaverse 120 through the first metaverse 102. Virtual-world server 150 may be configured to store a login credential 154 associated with each of the second metaverse 120, the third metaverse 122 and the fourth metaverse 124, wherein a login credential 154 provides access to the respective metaverse. In one embodiment, a same login credential 154 may be used to access two or more secondary metaverses through the first metaverse 102.

If the first user 110 is not authorized to access the second virtual environment (e.g., second metaverse 120) through the first virtual environment (e.g., first metaverse 102), method 300 ends here and the first user 110 is denied access to the second virtual environment. If the first user 110 is authorized to access the second virtual environment (e.g., second metaverse 120) through the first virtual environment (e.g., first metaverse 102), method 300 proceeds to operation 310 where the virtual-world server selects, from the memory (e.g., a memory of the virtual-world server 150), a first avatar configuration 164 associated with the second virtual environment (e.g., second metaverse 120).

As described above, virtual-world server 150 may be configured to manage a plurality of avatars for the first metaverse 102 and the secondary virtual environments (e.g., second metaverse 120, third metaverse 122 and fourth metaverse 124), and may allow the first user 110 to use in a metaverse one or more avatars configured for use in the metaverse. For example, virtual-world server 150 may be configured to store avatar configurations 164 associated with avatars the first user 110 can use in the first metaverse 102 and each of the secondary metaverses (e.g., second metaverse 120, third metaverse 122 and fourth metaverse 124). In one example, after entering the first metaverse 102 using the user credential 152, the first user 110 may request the virtual-world server 150 to enter the second metaverse 120 through the first metaverse 102. After determining that that first user 110 is authorized to access the second metaverse 120, virtual-world server 150 may be configured to select an avatar configuration 164 configured for use in the second metaverse 120. The selection of the avatar configuration 164 may include selecting an avatar configuration 164 pre-selected to be used for the second metaverse 120 (e.g., by first user 110) or selecting a default avatar configuration 164.

At operation 312, virtual-world server 150 generates a first avatar (e.g., first avatar 114) for the first user 110 based on the selected first avatar configuration 164.

As described above, virtual-world server 150 may be configured to generate an avatar for the first user 110 based on the selected avatar configuration 164 associated with the second metaverse 120. Generating the avatar may include rendering the avatar according to the selected avatar configuration 164 for display to the first user 110 on the first user device 104 (e.g., on display 206 of the first user device 104).

At operation 314, virtual-world server 150 generates a virtual pass 156 for the first avatar 114 of the first user 110 to enter the second virtual environment (e.g., second metaverse 120) via the first virtual environment (e.g., first metaverse 102).

As described above, if the first user 110 is pre-registered with the virtual-world server 150 to access the second metaverse 120 through the first metaverse 102, virtual-world server 150 may determine that the first user 110 is authorized to access the second metaverse 120 through the first metaverse 102. In response to determining that that first user 110 is authorized to access the second metaverse 120, virtual-world server 150 may be configured to generate a virtual pass 156 for the first user 110 to enter the second metaverse 120 through the first metaverse 102. The virtual pass 156 may include the login credential 154 that provides the first user 110 access to the second metaverse 120. The first user 110 may enter the second metaverse 120 using the virtual pass 156. In one embodiment, virtual-world server 150 may transmit the virtual pass 156 to the server that manages the second metaverse 120 and receive authorization from the server for the first user 110 to enter the second metaverse 120.

Once the first user 110 enters the second metaverse 120 (e.g. through first avatar 114), first user 110 may perform one or more virtual data interactions within the second metaverse 120. In one embodiment, virtual data interactions performed within the second metaverse 120 may be managed by a server that manages the second metaverse 120. Virtual data interactions performed in the second metaverse may be same as or similar to the virtual data interactions the first user 110 may perform in the first metaverse 102 as described above. For example, virtual data interactions that may be performed in the second metaverse 120 may include, but are not limited to, one or more of transferring virtual data objects to a second user or virtual entity in the second metaverse 120, receiving virtual data objects from a second user or virtual entity in the second metaverse 120, transferring other digital assets to a second user or virtual entity in the second metaverse 120, and receiving other digital assets from a second user or virtual entity in the second metaverse 120.

Figure 4:
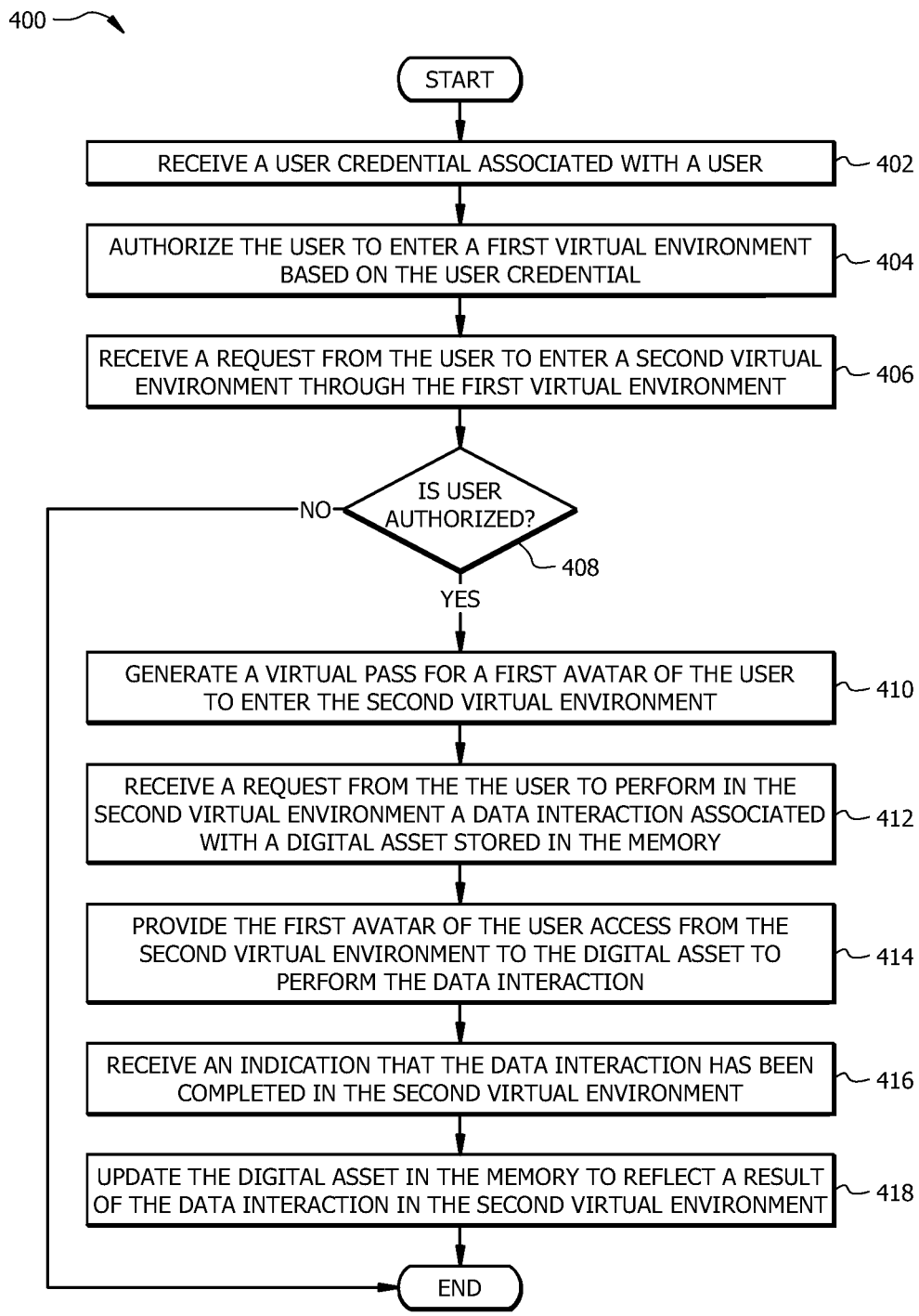
FIG. 4 illustrates a flowchart of an example method for managing digital assets for multiple metaverse environments, in accordance with one or more embodiments of the present disclosure.

FIG. 4 illustrates a flowchart of an example method 400 for managing digital assets for multiple metaverse environments, in accordance with one or more embodiments of the present disclosure. Method 400 may be performed by the virtual-world server 150 shown in FIG. 1.

At operation 402, virtual-world server 150 receives a user credential 152 associated with a user (e.g., first user 110).

As described above, virtual-world server 150 may be configured to use a user credential 152 collected from the first user 110, generated by the first user 110 or assigned to the first user 110 during real-world data interactions with the first user 110, to verify identity of the first user 110 in the first metaverse 102. Thus, the user credential 152 provides the first user 110 access to the first metaverse 102. For example, the user credential 152 may be used by the virtual-world server 150 to verify that the first avatar 114 belongs to and is controlled by the first user 110.

In one example, a retina scan of the first user 110 may have been previously collected from the first user 110 as part of a real-world data interaction with the first user 110. Information relating to the retina scan may have been stored as part of the user data 132. The retina scan of the first user 110 may be used as the user credential 152. When the first user 110 uses the user device 104 (e.g., VR headset) to enter the first metaverse 102 via first avatar 114, the virtual-world server 150 obtains a retina scan of the first user 110 using a biometric device (e.g., biometric device 218) provided at the user device 104. The retina scan obtained via the user device is compared with the retina scan of the first user 110 stored as part of user data 132 in the real-world server 130. When the two retina scans match, virtual-world server 150 determines that the first avatar 114 is associated with the first user 110 and may authorize and allow the first avatar 114 to enter the first metaverse 102.

In another example, user credential 152 may include a username and password generated by the first user 110 as part of registering with the real-world server 130 and/or virtual-world server 150. The virtual-world server 150 may allow the first user 110 to use the username and password to enter the first metaverse 102 via first avatar 114.

At operation 404, virtual-world server 150 authorizes the first user 110 to access a first virtual environment (e.g., first metaverse 102) based on the user credential 152.

As described above, first user 110 may first request the virtual-world server 150 to provide access to the first metaverse 102, wherein requesting access to the first metaverse 102 may include providing the user credential 152 previously setup with the real-world server 130 and/or virtual-world server 150. Upon receiving the request from the first user 110, virtual-world server 150 may verify the user credential 152 and authorize the first user 110 to enter the first metaverse 102 through the first avatar 114.

At operation 406, virtual-world server 150 receives a request from the first user 110 to enter a second virtual environment (e.g., second metaverse 120) accessible through the first virtual environment (e.g., first metaverse 102).

As described above, virtual-world server 150 may be configured to allow the first user 110 to access one or more secondary metaverse environments (e.g., second metaverse 120, third metaverse 122 and fourth metaverse 124) through the first metaverse 102. Each of the second metaverse 120, the third metaverse 122 and the fourth metaverse 124 may be managed by their respective servers connected to the network 180, wherein virtual-world server 150 may be communicatively coupled to each of the servers via network 180. Essentially, first metaverse 102 may act as a single portal that allows first user 110 access the second metaverse 120, the third metaverse 122 and the fourth metaverse 124 using a single user identity associated with the first user 110. After gaining access to the first metaverse 102, first user 110 may request the virtual-world server 150 access to any one of the second metaverse 120, third metaverse 122 and fourth metaverse 124. For example, first user 110 may request to access the second metaverse 120.

At operation 408, virtual-world server 150 determines whether the first user 110 is authorized to access the second virtual environment (e.g., second metaverse 120) through the first virtual environment (e.g., first metaverse 102).

As described above, upon receiving the request to access the second metaverse 120 through the first metaverse 102, virtual-world server 150 may determine whether the first user 110 is authorized to access the second metaverse 120. For example, the first user 110 may have pre-registered with the virtual-world server 150 to access the second metaverse 120 through the first metaverse 102. As part of registering to access the second metaverse 120 through the first metaverse 102, the first user 110 may have generated or provided a login credential 154 that provides the first user access to the second metaverse 120. In one embodiment, as part of registering the first user 110 to access the second metaverse 120 through the first metaverse 102, virtual-world server 150 may negotiate with a server that manages the second metaverse 120 to agree upon the login credential 154 that provides the first user 110 access to the second metaverse 120. In an alternative embodiment, the first user 110 may independently register with the server that manages the second metaverse 120 and generate the login credential 154 as part of the registration. Once independently registered to access the second metaverse 120, the first user 110 may provide the pre-generated login credential 154 to the virtual-world server 150 when registering with the virtual-world server 150 to access the second metaverse 120 through the first metaverse 102. Virtual-world server 150 may be configured to store a login credential 154 associated with each of the second metaverse 120, the third metaverse 122 and the fourth metaverse 124, wherein a login credential 154 provides access to the respective metaverse. In one embodiment, a same login credential 154 may be used to access two or more secondary metaverses through the first metaverse 102.

If the first user 110 is not authorized to access the second virtual environment (e.g., second metaverse 120) through the first virtual environment (e.g., first metaverse 102), method 400 ends here and the first user 110 is denied access to the second virtual environment. If the first user 110 is authorized to access the second virtual environment (e.g., second metaverse 120) through the first virtual environment (e.g., first metaverse 102), method 400 proceeds to operation 410 where the virtual-world server 150 generates a virtual pass 156 for a first avatar 114 of the first user 110 associated with the second virtual environment (e.g., second metaverse 120) to enter the second virtual environment via the first virtual environment (e.g., first metaverse 102).

As described above, if the first user 110 is pre-registered with the virtual-world server 150 to access the second metaverse 120 through the first metaverse 102, virtual-world server 150 may determine that the first user 110 is authorized to access the second metaverse 120 through the first metaverse 102. In response to determining that that first user 110 is authorized to access the second metaverse 120, virtual-world server 150 may be configured to generate a virtual pass 156 for the first user 110 to enter the second metaverse 120 through the first metaverse 102. The virtual pass 156 may include the login credential 154 that provides the first user 110 access to the second metaverse 120. The first user 110 may enter the second metaverse 120 using the virtual pass 156. In one embodiment, virtual-world server 150 may transmit the virtual pass 156 to the server that manages the second metaverse 120 and receive authorization from the server for the first user 110 to enter the second metaverse 120.

Once the first user 110 enters the second metaverse 120 (e.g. through first avatar 114), first user 110 may perform one or more virtual data interactions within the second metaverse 120. In one embodiment, virtual data interactions performed within the second metaverse 120 may be managed by a server that manages the second metaverse 120. Virtual data interactions performed in the second metaverse may be same as or similar to the virtual data interactions the first user 110 may perform in the first metaverse 102 as described above. For example, virtual data interactions that may be performed in the second metaverse 120 may include, but are not limited to, one or more of transferring virtual data objects to a second user or virtual entity in the second metaverse 120, receiving virtual data objects from a second user or virtual entity in the second metaverse 120, transferring other digital assets to a second user or virtual entity in the second metaverse 120, and receiving other digital assets from a second user or virtual entity in the second metaverse 120.

At operation 412, virtual-world server 150 receives a request from the first user 110 to perform in the second virtual environment (e.g., second metaverse 120) a data interaction associated with a digital asset 158 stored in the memory (e.g., a memory of the virtual-world server 150).

As described above, virtual-world server 150 may store a plurality of digital assets 158 associated with the first user 110. Digital assets 158 associated with the first user 110 may include, but are not limited to, pictures, documents, videos, digital books, audio files, illustrations, manuscripts, emails and other digital content. Virtual-world server 150 may be configured to allow first user 110 to perform virtual data interactions associated with one or more digital assets 158 in any of the metaverses (e.g., first metaverse 102, second metaverse 120, third metaverse 122 and fourth metaverse 124). A data interaction associated with a digital asset 158 may include, but is not limited to, transferring the digital asset 158 to another user or virtual entity, receiving the digital asset 158 from another user or virtual entity, updating or modifying at least a portion of the digital asset 158 or converting at least a portion of the digital asset 158 into virtual data objects 162. In one example, after the first user 110 gains access to the second metaverse 120 through the first metaverse 102 as described above, the first user 110 may request the virtual-world server 150 to perform within the second metaverse 120 a virtual data interaction in relation to a digital asset 158 stored at the virtual-world server 150.

At operation 414, virtual-world server 150 provides the first avatar (e.g., first avatar 114) of the first user 110 access from the second virtual environment (e.g., second metaverse 120) to the digital asset 158 to perform the data interaction.

As described above, upon receiving the request from the first user 110, virtual-world server 150 may provide the first user 110 (e.g., first avatar 114) access to the digital asset 158 from the second metaverse 120. Once access to the digital asset 158 is provided, data interactions associated with the digital asset 158 may be performed in the second metaverse 120 as if the digital asset 158 is stored in the second metaverse 120. For example, first user 110 may perform a data interaction associated with the digital asset 158 in the second metaverse 120.

At operation 416, virtual-world server 150 receives an indication that the data interaction has been completed in the second virtual environment (e.g., second metaverse 120).

At operation 418, virtual-world server 150 updates the digital asset 158 in the memory (e.g., the memory of the virtual-world server 150) to reflect a result of the data interaction in the second virtual environment (e.g., second metaverse 120).

As described above, when the data interaction is completed in the second metaverse 120, virtual-world server 150 may receive an indication that the data interaction has been completed in the second metaverse 120. In response, virtual-world server 150 may update the digital asset 158 stored in at the virtual-world server 150 to reflect a result of the data interaction in the second metaverse 120.

In one embodiment, the data interaction associated with the digital asset 158 as performed by the first user 110 in the second metaverse 120 may include transferring the digital asset 158 to another user or virtual entity within the second metaverse 120. In response to receiving an indication that the transfer of the digital asset 158 has been completed in the second metaverse 120, virtual-world server 150 may delete the digital asset 158 from the virtual-world server 150 so that the digital asset 158 is not available for subsequent use by the first user 110 in any of the metaverses. Other examples of data interactions performed in relation to a digital asset 158 are described above.

Figure 5:
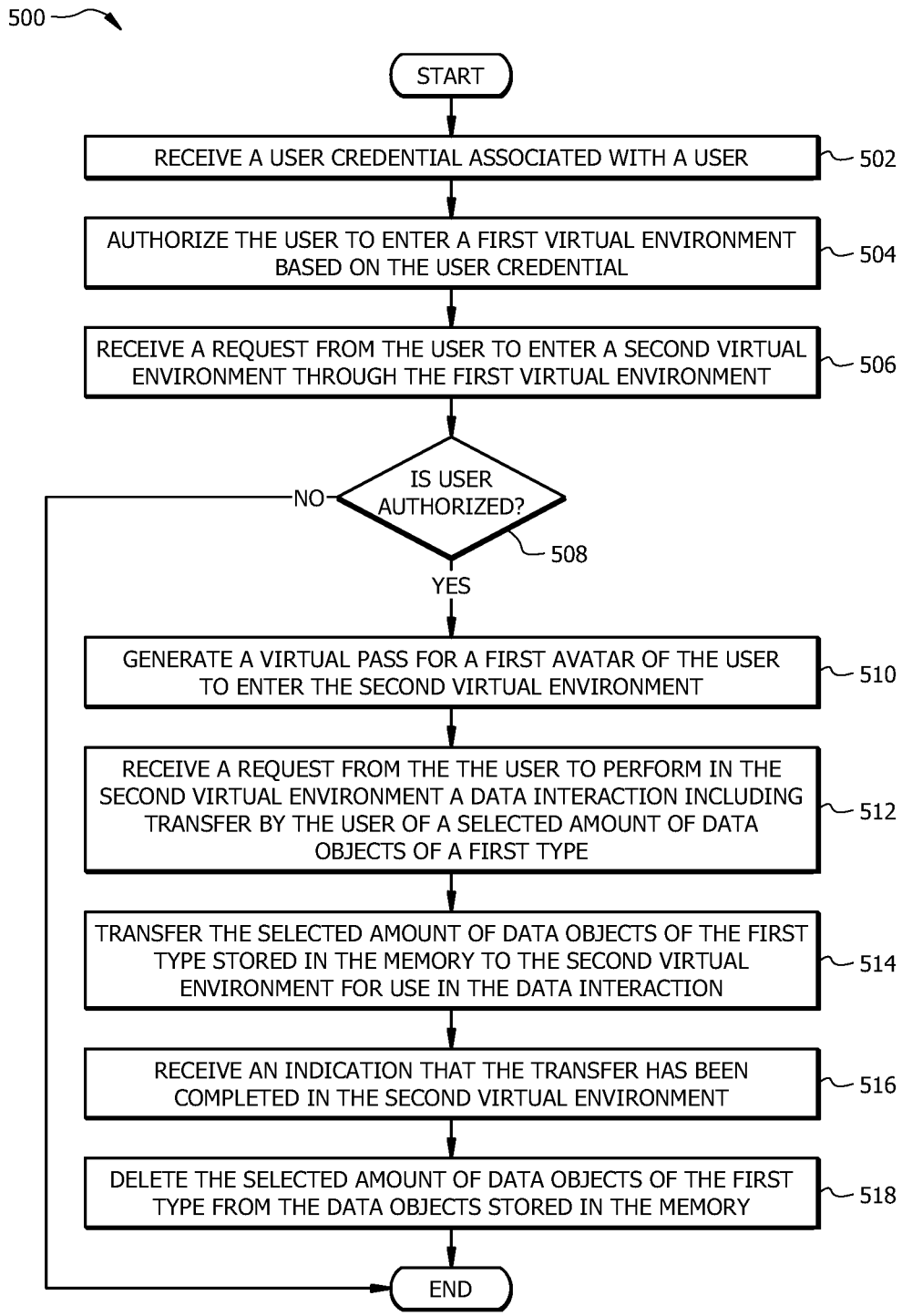
FIG. 5 illustrates a flowchart of an example method for managing digital objects for multiple metaverse environments, in accordance with one or more embodiments of the present disclosure.

FIG. 5 illustrates a flowchart of an example method 500 for managing digital objects for multiple metaverse environments, in accordance with one or more embodiments of the present disclosure. Method 500 may be performed by the virtual-world server 150 shown in FIG. 1.

At operation 502, virtual-world server 150 receives a user credential 152 associated with a user (e.g., first user 110).

As described above, virtual-world server 150 may be configured to use a user credential 152 collected from the first user 110, generated by the first user 110 or assigned to the first user 110 during real-world data interactions with the first user 110, to verify identity of the first user 110 in the first metaverse 102. Thus, the user credential 152 provides the first user 110 access to the first metaverse 102. For example, the user credential 152 may be used by the virtual-world server 150 to verify that the first avatar 114 belongs to and is controlled by the first user 110.

In one example, a retina scan of the first user 110 may have been previously collected from the first user 110 as part of a real-world data interaction with the first user 110. Information relating to the retina scan may have been stored as part of the user data 132. The retina scan of the first user 110 may be used as the user credential 152. When the first user 110 uses the user device 104 (e.g., VR headset) to enter the first metaverse 102 via first avatar 114, the virtual-world server 150 obtains a retina scan of the first user 110 using a biometric device (e.g., biometric device 218) provided at the user device 104. The retina scan obtained via the user device is compared with the retina scan of the first user 110 stored as part of user data 132 in the real-world server 130. When the two retina scans match, virtual-world server 150 determines that the first avatar 114 is associated with the first user 110 and may authorize and allow the first avatar 114 to enter the first metaverse 102.

In another example, user credential 152 may include a username and password generated by the first user 110 as part of registering with the real-world server 130 and/or virtual-world server 150. The virtual-world server 150 may allow the first user 110 to use the username and password to enter the first metaverse 102 via first avatar 114.

At operation 504, virtual-world server 150 authorizes the first user 110 to access a first virtual environment (e.g., first metaverse 102) based on the user credential 152.

As described above, first user 110 may first request the virtual-world server 150 to provide access to the first metaverse 102, wherein requesting access to the first metaverse 102 may include providing the user credential 152 previously setup with the real-world server 130 and/or virtual-world server 150. Upon receiving the request from the first user 110, virtual-world server 150 may verify the user credential 152 and authorize the first user 110 to enter the first metaverse 102 through the first avatar 114.

At operation 506, virtual-world server 150 receives a request from the first user 110 to enter a second virtual environment (e.g., second metaverse 120) accessible through the first virtual environment (e.g., first metaverse 102).

As described above, virtual-world server 150 may be configured to allow the first user 110 to access one or more secondary metaverse environments (e.g., second metaverse 120, third metaverse 122 and fourth metaverse 124) through the first metaverse 102. Each of the second metaverse 120, the third metaverse 122 and the fourth metaverse 124 may be managed by their respective servers connected to the network 180, wherein virtual-world server 150 may be communicatively coupled to each of the servers via network 180. Essentially, first metaverse 102 may act as a single portal that allows first user 110 access the second metaverse 120, the third metaverse 122 and the fourth metaverse 124 using a single user identity associated with the first user 110. After gaining access to the first metaverse 102, first user 110 may request the virtual-world server 150 access to any one of the second metaverse 120, third metaverse 122 and fourth metaverse 124. For example, first user 110 may request to access the second metaverse 120.

At operation 508, virtual-world server 150 determines whether the first user 110 is authorized to access the second virtual environment (e.g., second metaverse 120) through the first virtual environment (e.g., first metaverse 102).

As described above, upon receiving the request to access the second metaverse 120 through the first metaverse 102, virtual-world server 150 may determine whether the first user 110 is authorized to access the second metaverse 120. For example, the first user 110 may have pre-registered with the virtual-world server 150 to access the second metaverse 120 through the first metaverse 102. As part of registering to access the second metaverse 120 through the first metaverse 102, the first user 110 may have generated or provided a login credential 154 that provides the first user access to the second metaverse 120. In one embodiment, as part of registering the first user 110 to access the second metaverse 120 through the first metaverse 102, virtual-world server 150 may negotiate with a server that manages the second metaverse 120 to agree upon the login credential 154 that provides the first user 110 access to the second metaverse 120. In an alternative embodiment, the first user 110 may independently register with the server that manages the second metaverse 120 and generate the login credential 154 as part of the registration. Once independently registered to access the second metaverse 120, the first user 110 may provide the pre-generated login credential 154 to the virtual-world server 150 when registering with the virtual-world server 150 to access the second metaverse 120 through the first metaverse 102. Virtual-world server 150 may be configured to store a login credential 154 associated with each of the second metaverse 120, the third metaverse 122 and the fourth metaverse 124, wherein a login credential 154 provides access to the respective metaverse. In one embodiment, a same login credential 154 may be used to access two or more secondary metaverses through the first metaverse 102.

If the first user 110 is not authorized to access the second virtual environment (e.g., second metaverse 120) through the first virtual environment (e.g., first metaverse 102), method 500 ends here and the first user 110 is denied access to the second virtual environment. If the first user 110 is authorized to access the second virtual environment (e.g., second metaverse 120) through the first virtual environment (e.g., first metaverse 102), method 500 proceeds to operation 510 where the virtual-world server 150 generates a virtual pass 156 for a first avatar 114 of the first user 110 associated with the second virtual environment (e.g., second metaverse 120) to enter the second virtual environment via the first virtual environment (e.g., first metaverse 102).

As described above, if the first user 110 is pre-registered with the virtual-world server 150 to access the second metaverse 120 through the first metaverse 102, virtual-world server 150 may determine that the first user 110 is authorized to access the second metaverse 120 through the first metaverse 102. In response to determining that that first user 110 is authorized to access the second metaverse 120, virtual-world server 150 may be configured to generate a virtual pass 156 for the first user 110 to enter the second metaverse 120 through the first metaverse 102. The virtual pass 156 may include the login credential 154 that provides the first user 110 access to the second metaverse 120. The first user 110 may enter the second metaverse 120 using the virtual pass 156. In one embodiment, virtual-world server 150 may transmit the virtual pass 156 to the server that manages the second metaverse 120 and receive authorization from the server for the first user 110 to enter the second metaverse 120.

Once the first user 110 enters the second metaverse 120 (e.g. through first avatar 114), first user 110 may perform one or more virtual data interactions within the second metaverse 120. In one embodiment, virtual data interactions performed within the second metaverse 120 may be managed by a server that manages the second metaverse 120. Virtual data interactions performed in the second metaverse may be same as or similar to the virtual data interactions the first user 110 may perform in the first metaverse 102 as described above. For example, virtual data interactions that may be performed in the second metaverse 120 may include, but are not limited to, one or more of transferring virtual data objects to a second user or virtual entity in the second metaverse 120, receiving virtual data objects from a second user or virtual entity in the second metaverse 120, transferring other digital assets to a second user or virtual entity in the second metaverse 120, and receiving other digital assets from a second user or virtual entity in the second metaverse 120.

At operation 512, virtual-world server 150 receives a request from the first user 110 to perform in the second virtual environment (e.g., second metaverse 120) a data interaction including transfer by the first user 110 of a selected amount of a first type of data object (e.g., virtual data objects 162 of the second type supported by the second metaverse 120).

As described above, virtual-world server 150 may be configured to store virtual data objects 162 of one or more types, wherein virtual data objects 162 of each type stored at the virtual-world server 150 is supported by at least one of the first metaverse 102, second metaverse 120, third metaverse 122 and fourth metaverse 124. For example, virtual data objects 162 stored in the virtual data file 160 may include virtual data objects 162 of one or more types. In one embodiment, virtual data file 160 may store one or more virtual data objects 162 of each type supported by the first metaverse 102, second metaverse 120, third metaverse 122 and fourth metaverse 124. In other words, a first portion of the virtual data objects 162 stored in the virtual data file 160 correspond to the first type supported by the first metaverse 102, a second portion of the virtual data objects 162 correspond to the second type supported by the second metaverse 120, a third portion of the virtual data objects 162 correspond to the third type supported by the third metaverse 122, and a fourth portion of the virtual data objects 162 correspond to the fourth type supported by the fourth metaverse 120. In one example, after the first user 110 gains access to the second metaverse 120 through the first metaverse 102 as described above, the first user 110 may request the virtual-world server 150 to perform within the second metaverse 120 a virtual data interaction including transferring a selected amount of virtual data objects 162 of the second type to a second user (e.g., second user 112) or a virtual entity in the second metaverse 120.

At operation 514, virtual-world server 150 transfers the selected amount of the first type of data object (e.g., virtual data objects 162 of the second type supported by the second metaverse 120) from a first portion of data objects (e.g., virtual data objects 162) stored in the memory (e.g., a memory of the virtual-world server 150) to the second virtual environment (e.g., second metaverse 120) for use in the data interaction. For example, upon receiving the request from the first user 110, virtual-world server 150 may transfer to the second metaverse 120 the selected amount of virtual data objects 162 of the second type from the virtual data file 160 for use in the requested data interaction.

At operation 518, virtual-world server 150 receives an indication that the transfer has been completed in the second virtual environment (e.g., second metaverse 120).

At operation 520, virtual-world server 150 deletes the selected amount of the first type of data object (e.g., virtual data objects 162 of the second type supported by the second metaverse 120) from the first portion of data objects stored in the memory (e.g., the memory of the virtual-world server 150).

As described above, when the transfer is completed in the second metaverse 120, virtual-world server 150 may receive an indication that the data interaction has been completed in the second metaverse 120. In response, virtual-world server 150 may update the virtual data file 160 to reflect the transfer of virtual data objects of the second type. For example, virtual-world server 150 may delete the second amount of virtual data objects 162 of the second data type from the virtual data file 160.

Figure 6:
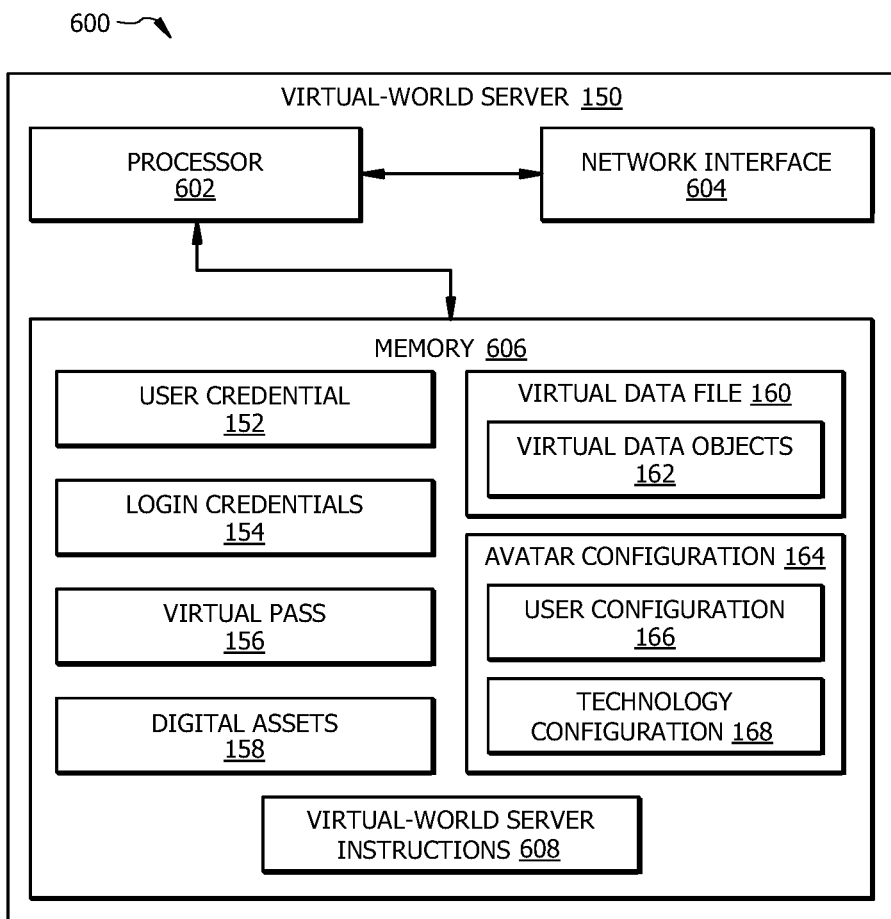
FIG. 6 illustrates an example schematic diagram of the virtual-world server 150 shown in FIG. 1, in accordance with one or more aspects of the present disclosure.

FIG. 6 illustrates an example schematic diagram 600 of the virtual-world server 150 shown in FIG. 1, in accordance with one or more aspects of the present disclosure.

The virtual-world server 150 comprises a processor 602, a memory 606, and a network interface 604. The virtual-world server 150 may be configured as shown in FIG. 6 or in any other suitable configuration.

The processor 602 comprises one or more processors operably coupled to the memory 606. The processor 602 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 602 may be a programmable logic device, a microcontroller, a microprocessor, or any suitable combination of the preceding. The processor 602 is communicatively coupled to and in signal communication with the memory 606. The one or more processors are configured to process data and may be implemented in hardware or software. For example, the processor 602 may be 8-bit, 16-bit, 32-bit, 64-bit or of any other suitable architecture. The processor 602 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., virtual-world server instructions 608) to implement the virtual-world server 150. In this way, processor 602 may be a special-purpose computer designed to implement the functions disclosed herein. In one or more embodiments, the virtual-world server 150 is implemented using logic units, FPGAs, ASICs, DSPs, or any other suitable hardware. The virtual-world server 150 is configured to operate as described with reference to FIGS. 3-5. For example, the processor 602 may be configured to perform at least a portion of the methods 300, 400 and 500 as described in FIGS. 3, 4 and 5 respectively.

The memory 606 comprises one or more disks, tape drives, or solid-state drives, and may be used as an over-flow data storage device, to store programs when such programs are selected for execution, and to store instructions and data that are read during program execution. The memory 606 may be volatile or non-volatile and may comprise a read-only memory (ROM), random-access memory (RAM), ternary content-addressable memory (TCAM), dynamic random-access memory (DRAM), and static random-access memory (SRAM).

The memory 606 is operable to store the user credential 152, login credentials 154, virtual pass 156, digital assets 158, virtual data file 160, virtual data objects 162, avatar configurations 164, user configurations 166, technology configurations 168 and the virtual-world server instructions 608. The virtual-world server instructions 608 may include any suitable set of instructions, logic, rules, or code operable to execute the virtual-world server 150.

The network interface 604 is configured to enable wired and/or wireless communications. The network interface 604 is configured to communicate data between the virtual-world server 150 and other devices, systems, or domains (e.g. user devices 104 and 106 and the real-world server 130). For example, the network interface 604 may comprise a Wi-Fi interface, a LAN interface, a WAN interface, a modem, a switch, or a router. The processor 602 is configured to send and receive data using the network interface 604. The network interface 604 may be configured to use any suitable type of communication protocol as would be appreciated by one of ordinary skill in the art.

Figure 7:
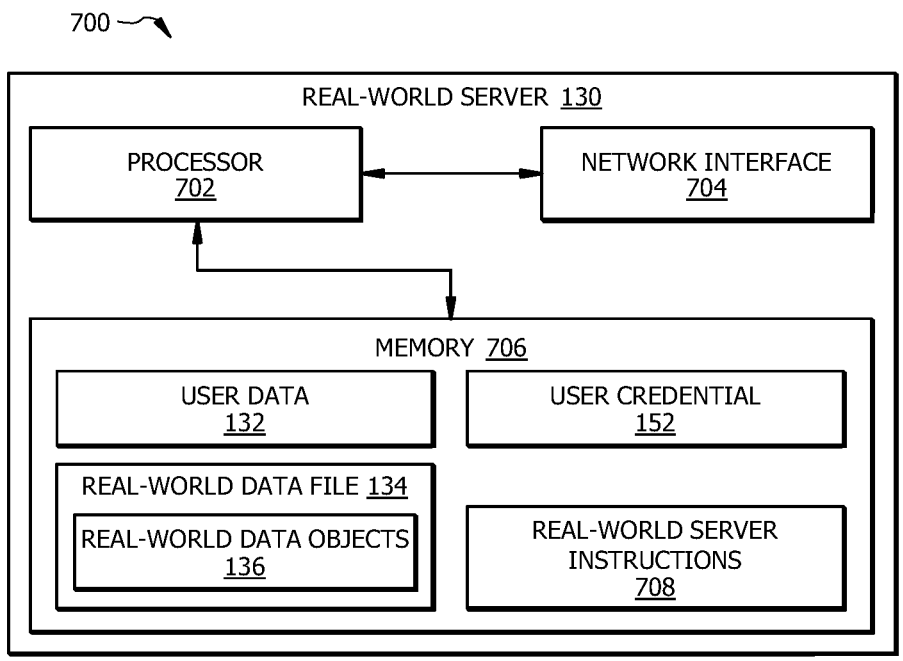
FIG. 7 illustrates an example schematic diagram of the real-world server 130 shown in FIG. 1, in accordance with one or more aspects of the present disclosure.

FIG. 7 illustrates an example schematic diagram 700 of the real-world server 130 shown in FIG. 1, in accordance with one or more aspects of the present disclosure.

The real-world server 130 comprises a processor 702, a memory 706, and a network interface 704. The real-world server 130 may be configured as shown in FIG. 7 or in any other suitable configuration.

The processor 702 comprises one or more processors operably coupled to the memory 706. The processor 702 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 702 may be a programmable logic device, a microcontroller, a microprocessor, or any suitable combination of the preceding. The processor 702 is communicatively coupled to and in signal communication with the memory 706. The one or more processors are configured to process data and may be implemented in hardware or software. For example, the processor 702 may be 8-bit, 16-bit, 32-bit, 64-bit or of any other suitable architecture. The processor 702 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (e.g., real-world server instructions 708) to implement the real-world server 130. In this way, processor 702 may be a special-purpose computer designed to implement the functions disclosed herein. In one or more embodiments, the real-world server 130 is implemented using logic units, FPGAs, ASICs, DSPs, or any other suitable hardware. The real-world server 130 is configured to operate as described with reference to FIG. 1.

The memory 706 comprises one or more disks, tape drives, or solid-state drives, and may be used as an over-flow data storage device, to store programs when such programs are selected for execution, and to store instructions and data that are read during program execution. The memory 706 may be volatile or non-volatile and may comprise a read-only memory (ROM), random-access memory (RAM), ternary content-addressable memory (TCAM), dynamic random-access memory (DRAM), and static random-access memory (SRAM).

The memory 706 is operable to store information relating to user data 132, real-world data file 134, real-world data objects 136, user credential 152, and the real-world server instructions 708. The real-world server instructions 708 may include any suitable set of instructions, logic, rules, or code operable to execute the real-world server 130.

The network interface 704 is configured to enable wired and/or wireless communications. The network interface 704 is configured to communicate data between the real-world server 130 and other devices, systems, or domains (e.g., user devices 104 and 106 and the virtual-world server 150). For example, the network interface 704 may comprise a Wi-Fi interface, a LAN interface, a WAN interface, a modem, a switch, or a router. The processor 702 is configured to send and receive data using the network interface 704. The network interface 704 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory associated with a first virtual environment that stores digital assets associated with a user;
at least one processor coupled to the memory and configured to:
receive a user credential associated with the user, wherein:
the user credential provides the user access to the first virtual environment;
the first virtual environment provides access to one or more secondary virtual environments;
authorize the user to access the first virtual environment based on the user credential, wherein the first virtual environment is a first metaverse environment;
receive a request from the user to enter a second virtual environment of the one or more secondary virtual environments accessible through the first virtual environment, wherein the second virtual environment is a second metaverse environment different from the first metaverse environment;
obtain a first avatar configuration associated with the second virtual environment, wherein:
the first avatar configuration defines a first avatar for use in the second virtual environment; and
the first avatar configuration is different from a second avatar configuration that defines a second avatar for use in the first virtual environment;
generate the first avatar for the user based on the first avatar configuration;
generate a virtual pass for the first avatar of the user to enter the second virtual environment via the first virtual environment;
receive a request from the user to perform in the second virtual environment a data interaction associated with a digital asset stored in the memory;
in response to receiving the request, provide the first avatar of the user access from the second virtual environment to the digital asset to perform the data interaction;
receive an indication that the data interaction has been completed in the second virtual environment; and
update the digital asset in the memory to reflect a result of the data interaction in the second virtual environment.

2. The system of claim 1, wherein:
the data interaction associated with the digital asset comprises transferring by the user the digital asset to a second user within the second virtual environment; and
the at least one processor is configured to:
in response to receiving an indication that the transfer of the digital has been completed in the second virtual environment, delete the digital asset from the memory.

3. The system of claim 1, wherein:
the data interaction associated with the digital asset comprises updating at least a portion of the digital asset in the second virtual environment; and
the at least one processor is configured to:
in response to receiving an indication that the portion of the digital asset has been updated in the second virtual environment, perform an update to the portion of the digital asset stored in the memory that corresponds to the update made to the portion of the digital asset in the second virtual environment.

4. The system of claim 1, wherein:
the data interaction associated with the digital asset comprises transferring by the user a selected amount of data objects to a second user in the second virtual environment; and
the at least one processor is configured to:
convert at least a portion of the digital asset into the selected amount of data objects for transfer to the second user in the second virtual environment;
receive an indication that the transfer of the selected amount of the data objects has been completed; and
update a value of the digital asset stored in the memory to reflect conversion of the portion of the digital asset into the selected amount of data objects.

5. The system of claim 1, wherein the at least one processor is further configured to:
receive an indication that the user has received a second digital asset within the second virtual environment; and
store a copy of the digital asset in the memory associated with the first virtual environment.

6. The system of claim 1, wherein:
the memory stores a login credential associated with the user to access each of the secondary virtual environments; and
the virtual pass to enter the second virtual environment comprises the login credential associated with the user for accessing the second virtual environment.

7. The system of claim 1, wherein the at least one processor is further configured to:
receive a request from the user to enter a third virtual environment of the one or more secondary virtual environments accessible through the first virtual environment;
generate a second virtual pass for a second avatar of the user associated with the third virtual environment to enter the third virtual environment via the first virtual environment;
receive a request from the user to perform in the third virtual environment a second data interaction associated with the digital asset stored in the memory; and
in response to receiving the request, provide the second avatar of the user access from the third virtual environment to the updated digital asset to perform the second data interaction.

8. A method for managing digital assets in virtual environments, comprising:
receive a user credential associated with a user, wherein:
the user credential provides the user access to a first virtual environment;
the first virtual environment provides access to one or more secondary virtual environments;
authorize the user to access the first virtual environment based on the user credential, wherein the first virtual environment is a first metaverse environment;
receive a request from the user to enter a second virtual environment of the one or more secondary virtual environments accessible through the first virtual environment, wherein the second virtual environment is a second metaverse environment different from the first metaverse environment;
obtain a first avatar configuration associated with the second virtual environment, wherein:
the first avatar configuration defines a first avatar for use in the second virtual environment; and
the first avatar configuration is different from a second avatar configuration that defines a second avatar for use in the first virtual environment;
generate the first avatar for the user based on the first avatar configuration;
generate a virtual pass for the first avatar of the user to enter the second virtual environment via the first virtual environment;
receive a request from the user to perform in the second virtual environment a data interaction associated with a digital asset stored in a memory associated with the first virtual environment;
in response to receiving the request, provide the first avatar of the user access from the second virtual environment to the digital asset to perform the data interaction;
receive an indication that the data interaction has been completed in the second virtual environment; and
update the digital asset in the memory to reflect a result of the data interaction in the second virtual environment.

9. The method of claim 8, wherein:
the data interaction associated with the digital asset comprises transferring by the user the digital asset to a second user within the second virtual environment; and
further comprising:
in response to receiving an indication that the transfer of the digital has been completed in the second virtual environment, deleting the digital asset from the memory.

10. The method of claim 8, wherein:
the data interaction associated with the digital asset comprises updating at least a portion of the digital asset in the second virtual environment; and
further comprising:
in response to receiving an indication that the portion of the digital asset has been updated in the second virtual environment, performing an update to the portion of the digital asset stored in the memory that corresponds to the update made to the portion of the digital asset in the second virtual environment.

11. The method of claim 8, wherein:
the data interaction associated with the digital asset comprises transferring by the user a selected amount of data objects to a second user in the second virtual environment; and
further comprising:
converting at least a portion of the digital asset into the selected amount of data objects for transfer to the second user in the second virtual environment;
receiving an indication that the transfer of the selected amount of the data objects has been completed; and
updating a value of the digital asset stored in the memory to reflect conversion of the portion of the digital asset into the selected amount of data objects.

12. The method of claim 8, further comprising:
receiving an indication that the user has received a second digital asset within the second virtual environment; and
storing a copy of the digital asset in the memory associated with the first virtual environment.

13. The method of claim 8, wherein:
the memory stores a login credential associated with the user to access each of the secondary virtual environments; and
the virtual pass to enter the second virtual environment comprises the login credential associated with the user for accessing the second virtual environment.

14. The method of claim 8, further comprising:
receiving a request from the user to enter a third virtual environment of the one or more secondary virtual environments accessible through the first virtual environment;
generating a second virtual pass for a second avatar of the user associated with the third virtual environment to enter the third virtual environment via the first virtual environment;
receiving a request from the user to perform in the third virtual environment a second data interaction associated with the digital asset stored in the memory; and
in response to receiving the request, provide the second avatar of the user access from the third virtual environment to the updated digital asset to perform the second data interaction.

15. A non-transitory computer-readable medium storing instructions that when executed by a processor cause the processor to:
receive a user credential associated with a user, wherein:
the user credential provides the user access to a first virtual environment;
the first virtual environment provides access to one or more secondary virtual environments;
authorize the user to access the first virtual environment based on the user credential, wherein the first virtual environment is a first metaverse environment;
receive a request from the user to enter a second virtual environment of the one or more secondary virtual environments accessible through the first virtual environment, wherein the second virtual environment is a second metaverse environment different from the first metaverse environment;
obtain a first avatar configuration associated with the second virtual environment, wherein:
the first avatar configuration defines a first avatar for use in the second virtual environment; and
the first avatar configuration is different from a second avatar configuration that defines a second avatar for use in the first virtual environment;
generate the first avatar for the user based on the first avatar configuration;
generate a virtual pass for the first avatar of the user to enter the second virtual environment via the first virtual environment;
receive a request from the user to perform in the second virtual environment a data interaction associated with a digital asset stored in a memory associated with the first virtual environment;
in response to receiving the request, provide the first avatar of the user access from the second virtual environment to the digital asset to perform the data interaction;
receive an indication that the data interaction has been completed in the second virtual environment; and
update the digital asset in the memory to reflect a result of the data interaction in the second virtual environment.

16. The non-transitory computer-readable medium of claim 15, wherein:
the data interaction associated with the digital asset comprises transferring by the user the digital asset to a second user within the second virtual environment; and
further comprising instructions that cause the processor to:
in response to receiving an indication that the transfer of the digital has been completed in the second virtual environment, delete the digital asset from the memory.

17. The non-transitory computer-readable medium of claim 15, wherein:
the data interaction associated with the digital asset comprises updating at least a portion of the digital asset in the second virtual environment; and
further comprising instructions that cause the processor to:
in response to receiving an indication that the portion of the digital asset has been updated in the second virtual environment, perform an update to the portion of the digital asset stored in the memory that corresponds to the update made to the portion of the digital asset in the second virtual environment.

18. The non-transitory computer-readable medium of claim 15, wherein:
the data interaction associated with the digital asset comprises transferring by the user a selected amount of data objects to a second user in the second virtual environment; and
further comprising instructions that cause the processor to:
convert at least a portion of the digital asset into the selected amount of data objects for transfer to the second user in the second virtual environment;
receive an indication that the transfer of the selected amount of the data objects has been completed; and
update a value of the digital asset stored in the memory to reflect conversion of the portion of the digital asset into the selected amount of data objects.

19. The non-transitory computer-readable medium of claim 15, further comprising instructions that cause the processor to:
receive an indication that the user has received a second digital asset within the second virtual environment; and
store a copy of the digital asset in the memory associated with the first virtual environment.

20. The non-transitory computer-readable medium of claim 15, wherein:
the memory stores a login credential associated with the user to access each of the secondary virtual environments; and
the virtual pass to enter the second virtual environment comprises the login credential associated with the user for accessing the second virtual environment.

* * * * *